United States Patent
Refai et al.

(10) Patent No.: US 6,788,917 B1
(45) Date of Patent: Sep. 7, 2004

(54) TIMING SYSTEMS AND METHODS FOR FORWARD LINK DIVERSITY IN SATELLITE RADIOTELEPHONE SYSTEMS

(75) Inventors: Wail M. Refai, Apex, NC (US); Peter D. Karabinis, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/488,058

(22) Filed: Jan. 19, 2000

(51) Int. Cl.[7] ............................................. H04B 7/185
(52) U.S. Cl. ..................... 455/12.1; 455/429; 370/316
(58) Field of Search ................................ 455/427, 429, 455/430, 12.1, 13.1, 13.2; 370/316, 326, 321

(56) References Cited

U.S. PATENT DOCUMENTS

| | | | |
|---|---|---|---|
| 3,922,496 A | | 11/1975 | Gabbard et al. |
| 4,107,608 A | | 8/1978 | Saburi |
| 5,465,096 A | * | 11/1995 | Nawata ...................... 342/354 |
| 5,592,481 A | * | 1/1997 | Wiedeman et al. ......... 370/316 |
| 5,640,672 A | * | 6/1997 | Nawata ...................... 455/12.1 |
| 5,722,049 A | | 2/1998 | Hassan et al. .............. 455/54.1 |
| 5,745,484 A | | 4/1998 | Scott .......................... 370/347 |
| 5,768,266 A | | 6/1998 | Thompson et al. |
| 5,839,053 A | | 11/1998 | Bosch et al. ............... 455/13.1 |
| 5,841,766 A | | 11/1998 | Dent et al. .................. 370/321 |
| 6,138,012 A | * | 10/2000 | Krutz et al. ................ 455/427 |
| 6,154,452 A | * | 11/2000 | Marko et al. ............... 370/321 |
| 6,275,475 B1 | * | 8/2001 | Emmons et al. ............ 370/276 |
| 6,314,269 B1 | * | 11/2001 | Hart et al. .................. 455/12.1 |
| 6,434,361 B1 | | 8/2002 | Carrozza et al. |

FOREIGN PATENT DOCUMENTS

| | | |
|---|---|---|
| EP | 0 158 327 A2 | 10/1985 |
| EP | 0 632 605 A2 | 1/1995 |
| EP | 1 049 281 A1 | 11/2000 |
| FR | 2 766 966 | 5/1999 |
| JP | 01181336 | 7/1989 |
| WO | WO 96/19049 | 6/1996 |
| WO | WO 99/07083 | 2/1999 |

OTHER PUBLICATIONS

International Search Report, PCT/US01/01772, May 15, 2001.
Karabinis et al., Dual–Mode Cellular/Satellite Hand–Held Phone Technology, WESCON/96, Oct. 22, 1996, pp. 206–222.
International Search Report, PCT/US01/01791, Jul. 2, 2001.

* cited by examiner

Primary Examiner—Nay Maung
Assistant Examiner—Tanmay Lele
(74) Attorney, Agent, or Firm—Myers Bigel Sibley & Sajovec

(57) ABSTRACT

Downlink signal bursts are transmitted from a plurality of visible satellites to a plurality of user terminals in a downlink region that is serviced by the plurality of visible satellites. A first downlink signal burst is sent from a first one of the visible satellites to a first user terminal in the downlink region. A second downlink signal burst is sent from a second one of the visible satellites to the first user terminal to be received at a time that is a function of a separation distance of the first user terminal in the downlink region from the Time Alignment Center (TAC) of the downlink region. First downlink signal bursts and second downlink signal bursts also are sent to other user terminals in the downlink region. The first and second downlink signal bursts preferably are sent over respective first and second carrier frequencies. In preferred embodiments, the downlink signal bursts are transmitted in a plurality of repeating frames of downlink signal bursts of a predetermined frame repetition period. The second downlink signal burst is sent so that it will be received by the intended user terminal at a time offset from the first downlink signal burst that is one half the predetermined frame repetition period plus a delay time $\Delta T$ that is a function of a separation distance of the first user terminal in the downlink region from the TAC of the downlink region.

18 Claims, 19 Drawing Sheets

TIMING SYSTEMS AND METHODS FOR FORWARD LINK DIVERSITY IN SATELLITE RADIOTELEPHONE SYSTEMS

CROSS REFERENCE TO RELATED APPLICATION

This invention is related to co-filed application Ser. No. 09/488,201 to the present inventors, entitled RETURN LINK DIVERSITY SYSTEMS AND METHODS FOR SATELLITE RADIOTELEPHONE SYSTEMS USING GUARD TIMES and assigned to the assignee of the present invention, the disclosure of which is hereby incorporated herein by reference.

FIELD OF THE INVENTION

This invention relates to radiotelephone systems and methods, and more particularly to satellite radiotelephone systems and methods.

BACKGROUND OF THE INVENTION

Satellite radiotelephone systems are being developed and deployed at many locations around the world. As is known to those having skill in the art, a satellite radiotelephone system generally includes at least one satellite and at least one gateway that interfaces the satellite radiotelephone system to other telephone systems, such as wire telephone systems and/or cellular radiotelephone systems. A plurality of user terminals communicate with the at least one satellite, to provide satellite communications. The user terminals may be mobile or fixed. It will be understood that the user terminal may be a satellite radiotelephone, a combined cellular and satellite radiotelephone, a high functionality terminal including Personal Communications Systems (PCS) terminals and/or a portable computer with a satellite radiotelephone modem. The basic principles regarding a satellite radiotelephone system are described in the publication entitled *Dual-Mode Cellular/Satellite Hand-Held Phone Technology* by coinventor Karabinis et al., WESCON/96, pp. 206–222, Oct. 22, 1996, and need not be described in further detail herein.

In geostationary systems, or non-geostationary systems such as Low Earth Orbit (LEO) or Medium Earth Orbit (MEO) systems, a user terminal can communicate with more than one satellite. Accordingly, satellite diversity may be provided so that the user terminal communicates with at least two satellites, to thereby allow reduced shadowing and/or blockage problems. In particular, many of the obstructions in the direct line of sight do not completely block the path, but rather attenuate the signal. Given two or more satellites in view at the same time, the probability of signal blockage or shadowing to all satellites may be significantly reduced. In the forward link or downlink, satellite diversity may provide substantial link availability benefit if one of the satellites is completely obstructed. With multipath fading, forward link diversity can provide great benefits such as a 3 dB increase in received energy plus diversity gain.

It is known to achieve forward link diversity operation by allowing a user terminal in a downlink region to receive two bursts per frame from the best two visible satellites in two different Time Division Multiple Access (TDMA) time slots and two different carrier frequencies. The frequencies may be assigned based on the location of the user terminals, for example using a Region Oriented Frequency Assignment (ROFA) scheme.

When transmitting two bursts per frame for a user terminal, it generally is important for the user terminal to have knowledge of when to receive the two bursts per frame. It is desirable for the user terminal to know when to receive these bursts so that the bursts may be accurately received without the need to consume excessive power.

It is known to provide forward link diversity by dividing the user terminals into three groups that receive downlink signal bursts from a plurality of satellites transmitting TDMA signals. A first satellite first transmits to a first group of user terminals using a first number of time slots in a TDMA frame. In addition, the first satellite and a second satellite transmit in alternate TDMA frames to a second group of user terminals using a second number of time slots in the TDMA frame period. Finally, the second satellite transmits to a third group of user terminals using a third number of time slots in the TDMA frame period. Unfortunately, this scheme may only allow forward link diversity operation to the second group of user terminals. See for example U.S. Pat. No. 5,841,766 to Dent et al. entitled *Diversity-Oriented Channel Allocation In A Mobile Communications System* that is assigned to the assignee of the present application, the disclosure of which is hereby incorporated herein by reference in its entirety.

Another known solution is based upon the concept that the time slots are distributed along the hyperbola of constant differential time delay to two satellites and the carrier frequency usage is distributed along orthogonal lines. See the above-cited Dent et al. patent. Unfortunately, this approach may place restrictions with regard to the distribution of user terminals. In particular, this approach may only be applicable if the selected satellites are from one orbit so that the user terminals that are located on the contour of constant time delay will be orthogonal to the carrier frequency usage. This may not always be the case with Low Earth Orbit (LEO) or Medium Earth Orbit (MEO) systems.

Accordingly, notwithstanding the above-described improvements, there continues to be a desire to provide improved forward link diversity for satellite radiotelephone systems. There also is a need for forward link diversity systems and methods that need not place a restriction on the distribution of the user terminals in any particular region. These forward link diversity systems and methods also preferably should not restrict the selection of the best visible satellites serving the user terminals.

SUMMARY OF THE INVENTION

The present invention can determine a proper time of reception of two successive forward link signal bursts for user terminals that are randomly distributed in a downlink region based on the separation distance of the user terminal from the Time Alignment Center (TAC) of the downlink region and the position of the satellites. Accordingly, forward link diversity may be accomplished without the need to restrict the distribution of the user terminals in a downlink region. There also need be no restriction in selecting the best two visible satellites serving the user terminals. There may be a restriction in the size of the downlink region which can be based on the desired capacity for that region. Improved forward link diversity systems and methods thereby may be provided.

More specifically, the present invention can transmit downlink signal bursts from a plurality of visible satellites to a plurality of user terminals in a downlink region that is serviced by the plurality of visible satellites. A gateway transmits such that the diversity bursts are received by a user terminal at the TAC one-half a frame apart. A first downlink signal burst is sent from a first one of the visible satellites to a first user terminal in the downlink region. A second downlink signal burst is sent from a second one of the visible satellites to the first user terminal at a time that is a function of a separation distance of the first user terminal in the downlink region from the TAC of the downlink region. First downlink signal bursts and second downlink signal bursts also are sent to other user terminals in the downlink region. The first and second downlink signal bursts preferably are sent over respective first and second carrier frequencies.

In preferred embodiments, the downlink signal bursts are transmitted in a plurality of repeating frames of downlink signal bursts of a predetermined frame repetition period. The second downlink signal burst is sent at a time that is one-half the predetermined frame repetition period plus a delay time $\Delta T$ that is a function of a separation distance of the first user terminal in the downlink region from the TAC of the downlink region. The delay time $\Delta T$ preferably is determined by the differential propagation delay of the second downlink signal burst from the second one of the visible satellites to the first user terminal and to a user terminal that is located at the TAC, minus a differential propagation delay of the first downlink signal burst from the first one of the visible satellites to the first user terminal and to a user terminal that is located at the TAC. Accordingly, the timing of forward link signal bursts may be determined for diversity operation.

As was described above, the downlink region preferably is restricted in size based on the desired capacity for the downlink region. In particular, the downlink region preferably is sufficiently small such that the first user terminal can receive the first downlink signal burst from the first visible satellite and the second downlink signal burst from the second visible satellite when the first and second visible satellites are located on respective opposite sides of the horizon and the first user terminal is located in the downlink region farthest from the TAC, with sufficient time therebetween that the first user terminal can transmit an uplink signal burst between the first and second downlink signal bursts. The present invention also need not restrict selection of the best two visible satellites serving the user terminals. Thus, the first satellite preferably is at a highest elevation angle and the second satellite preferably is at a next highest elevation angle. However, other satellites may be used.

An uplink or return signal burst also preferably is transmitted from the first user terminal for reception by at least two of the plurality of visible satellites to thereby provide return link diversity. Preferably, the uplink signal burst is transmitted a guard time after an immediately proceeding uplink signal burst from an immediately proceeding one of the user terminals. The guard time preferably is based upon a time of arrival difference for the adjacent uplink signal bursts to one of the plurality of visible satellites.

A fixed guard time or a variable guard time may be used. The fixed guard time preferably corresponds to a maximum time of arrival difference between adjacent uplink signal bursts from a pair of user terminals that are a maximum distance apart to one of the plurality of visible satellites. The variable guard time preferably corresponds to a time of arrival difference between adjacent uplink signal bursts from a corresponding pair of user terminals to one of a plurality of visible satellites.

Downlink signal bursts may be received from a plurality of visible satellites at a user terminal that is located at any arbitrary position in a downlink region that is serviced by the plurality of visible satellites. A first downlink signal burst is received from a first one of the visible satellites at the user terminal that is located at any arbitrary position in the downlink region. A second downlink signal burst is received from a second one of the visible satellites at the user terminal that is located at any arbitrary position in the downlink region at a time that is a function of a separation distance of the arbitrary position of the user terminal in the downlink region from a Time Alignment Center (TAC) of the downlink region. The first downlink signal burst may be received over a first carrier frequency and the second downlink signal burst may be received over a second carrier frequency. The size of the downlink region may be limited as was described above. Uplink signal bursts also may be transmitted as was described above. The received first and second downlink signal bursts may be diversity combined at the user terminal.

Satellite radiotelephone systems according to the present invention communicate with a plurality of user terminals in a downlink region. The satellite radiotelephone system preferably includes a first satellite that sends a first downlink signal burst to each of the plurality of user terminals in the downlink region. A second satellite sends a second downlink signal burst to each of the plurality of user terminals to be received at a respective time that is a function of the separation distance of the respective user terminal in the downlink region from the TAC of the downlink region. The downlink time for the second downlink signal burst may be determined as was described above. The size of the downlink region may be limited in the manner that was described above. Uplink signal bursts also may be received in the manner that was described above.

Finally, satellite user terminals according to the present invention may be located at any arbitrary position in a downlink region that is serviced by a plurality of visible satellites. The satellite user terminals include a receiver that receives a first downlink signal burst from a first one of the visible satellites and that receives a second downlink signal burst from a second one of the visible satellites. A diversity combiner combines the received first and second downlink signal bursts. The first downlink signal burst preferably is received over a first carrier frequency and the second downlink signal burst preferably is received over a second carrier frequency. The downlink region may be sized as was described above. The user terminal may include a transmitter that transmits an uplink signal burst using guard times as was described above. Accordingly, satellite radiotelephone systems, methods and user terminals may be provided that can be randomly distributed in a downlink region, and that can include forward link diversity and return link diversity.

DETAILED DESCRIPTION OF PREFERRED EMBODIMENTS

Figure 1:
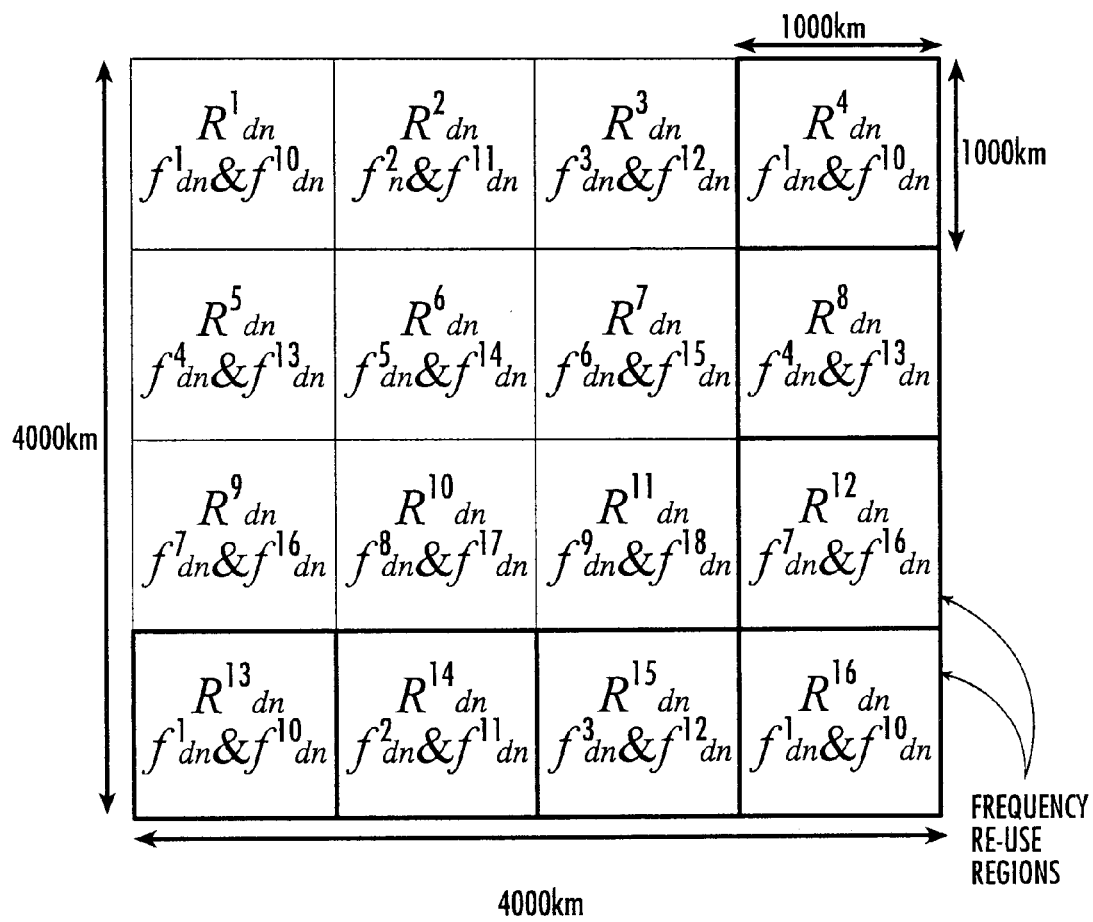
FIG. 1 illustrates a region divided into sixteen 1000 km×1000 km downlink regions, each of which is served by two 200 kHz downlink carriers through the best two satellites in view utilizing a ROFA scheme.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods and/or devices. The present invention may take the form of an entirely hardware embodiment or an embodiment combining software and hardware aspects.

The present invention is described herein with reference to block diagrams. It will be understood that a block, and combinations of blocks, can be implemented by computer program instructions. These program instructions may be provided to a processor to produce a machine, such that the instructions which execute on the processor create means for implementing the functions specified in the block or blocks. The computer program instructions may be executed by a processor to cause a series of operational steps to be performed by the processor to produce a computer implemented process such that the instructions which execute on the processor provide steps for implementing the functions specified in the block or blocks.

Accordingly, blocks of the drawings support combinations of means for performing the specified functions, combinations of steps for performing the specified functions and computer program instruction means for performing the specified functions. It will also be understood that each block, and combinations of blocks, can be implemented by special purpose hardware-based systems which perform the specified functions or steps, or by combinations of special purpose hardware and computer instructions.

The present invention can allow random distribution of the user terminals (UT) within any downlink (DL) region that may be served under a Region Oriented Frequency Assignment (ROFA) scheme, to operate in diversity mode in the forward link or downlink from a ground station (GS) through any two visible satellites to the UTs. A GS can determine a good estimate of the exact time of reception of the two forward link time slots to each UT through the two visible satellites by having the UTs report their positions.

Transmission from multiple satellites using multiple carriers to the same DL region is time coordinated to a point in the center of the DL region, which is called the Time Alignment Center (TAC). For a user located at the TAC, there is a Fixed Time Delay (FTD) between the reception of the first DL burst and the second DL burst, regardless of the satellite's position. This FTD preferably corresponds to one-half the frame repetition period. A user terminal located away from the TAC receives the second DL burst through the second satellite in view relative to the first DL burst by a shorter or longer time ($\Delta T$) than the FTD. The term $\Delta T$ can be positive or negative depending on the position of the UT with respect to the TAC. The term $\Delta T$ can be used to relate to the frame boundaries of the second satellite with respect to the frame boundaries of the first satellite. Details of determining the term $\Delta T$ so that the exact time of reception of the second DL burst can be determined, according to the present invention, now will be described.

Diversity operation in the forward link can be viewed as two visible satellites transmitting the same burst payload (information content) to the UT at two different timeslots and frequencies. It will be understood that the coding of the two diversity bursts may be different. The UT receiver can use any suitable diversity technique to combine the UT's similar bursts. In order to investigate the diversity operation for a non-geostationary TDMA satellite system in the forward link, a TDMA Low Earth Orbit (LEO) system is considered in this analysis as an example. Also, Continental United States including South Canada and North of Mexico areas were selected and called CONUS as an example that can be generalized over the globe. FIG. 1 shows an area, such as the CONUS area divided into 16 (1000 km×1000 km) downlink (DL) regions, ($R_{dn}^i$, $1 \leq i \leq 16$) and each region is serviced by Region Oriented Frequency Assignment (ROFA) technique where the frequencies are linked to the ground location of the UT.

In the forward link, UTs in every DL region $R_{dn}^i$ are served by two 200 kHz DL carriers preferably through the best two visible satellites. The satellite of the highest elevation angle preferably is considered the best satellite in view of the UT. It is called sat#$1_{u_i}$, where suffix (1) indicates the best satellite in view of UT#i. The forward link burst received to UT#i through sat#$1_{u_i}$ is defined as $b_{1_R}^{u_i}$ and is received on 200 kHz carrier frequency ($f_{dn}^j$). The satellite of the second highest elevation angle is defined as the second best satellite in view of the user. It is called sat#$2_{u_i}$, where the suffix (2) indicates the second best satellite in view of UT#i. The forward link burst received by UT#i through sat#$2_{u_i}$ is defined as $b_{2_R}^{u_i}$ and is received on another 200 kHz carrier frequency ($f_{dn}^k$). The reused carrier frequencies over the entire area are shown in the bold regions of FIG. 1.

When two satellites are co-visible to a UT and to the serving ground station, the UT and the two visible satellites will be allocated the two frequencies $f_{dn}^j$ and $f_{dn}^k$ assigned to that particular DL region. The forward link bursts assigned to the UT are split over two different paths. These paths are transmitted over the two visible satellites so that the UT receives $b_{1_R}^{u_i}$ from the first satellite in its assigned DL timeslot and carrier frequency $f_{dn}^j$ and receives $b_{2_R}^{u_i}$ from the second satellite in a different assigned DL timeslot and a different carrier frequency $f_{dn}^k$. The UT switches between $f_{dn}^j$ and $f_{dn}^k$ to receive $b_{1_R}^{u_i}$ and $b_{2_R}^{u_i}$ to perform a forward link diversity operation. The ground station or the gateway (GW) can assign two-DL timeslots to each UT for the forward link diversity operation in the following manner:

A broadcast channel (BCH) signal is transmitted periodically from the satellite. When a UT initiates a call or receives a call, it transmits a burst on the random access channel (RACH) after receiving a BCH message. In the RACH burst, the UT sends its own identity and the identity of the BCH message to the entity to which it is responding. The RACH message can operate like a conventional ALOHA system, where collision may occur. If collision occurs, RACH is repeated until it is successfully received at the ground station. The GW calculates the loop delay to the UT by measuring the delay between the transmission of the particular BCH and the RACH in return. The GW also calculates the loop delays through other neighboring BCHs received from other satellites in view and determines the UT's position. The GW transmits on a broadcast control channel (BCCH) the UT's position, forward link frequencies and return link frequency, forward link timeslots, and a calculated advance/retard time $\Delta T$. The advance/retard time $\Delta T$ is to be used by the UT to adjust its UL transmission with respect to the received DL burst $b_{1_R}^{u_i}$ through sat#$1_{u_i}$ such that the timing of the user's transmitted burst is between the reception of the two successive DL bursts $b_{1_R}^{u_i}$ and $b_{2_R}^{u_i}$. This advance/retard time adjustment is used in calculating the GT between transmitted bursts (of users served by the same return link carrier) to prevent burst collisions at all visible satellites. A detailed analysis of transmitted burst timing of users served by the same return link carrier to avoid burst collisions at all visible satellites will be provided below. Additional details may be found in the cross-referenced related application.

Figure 2:
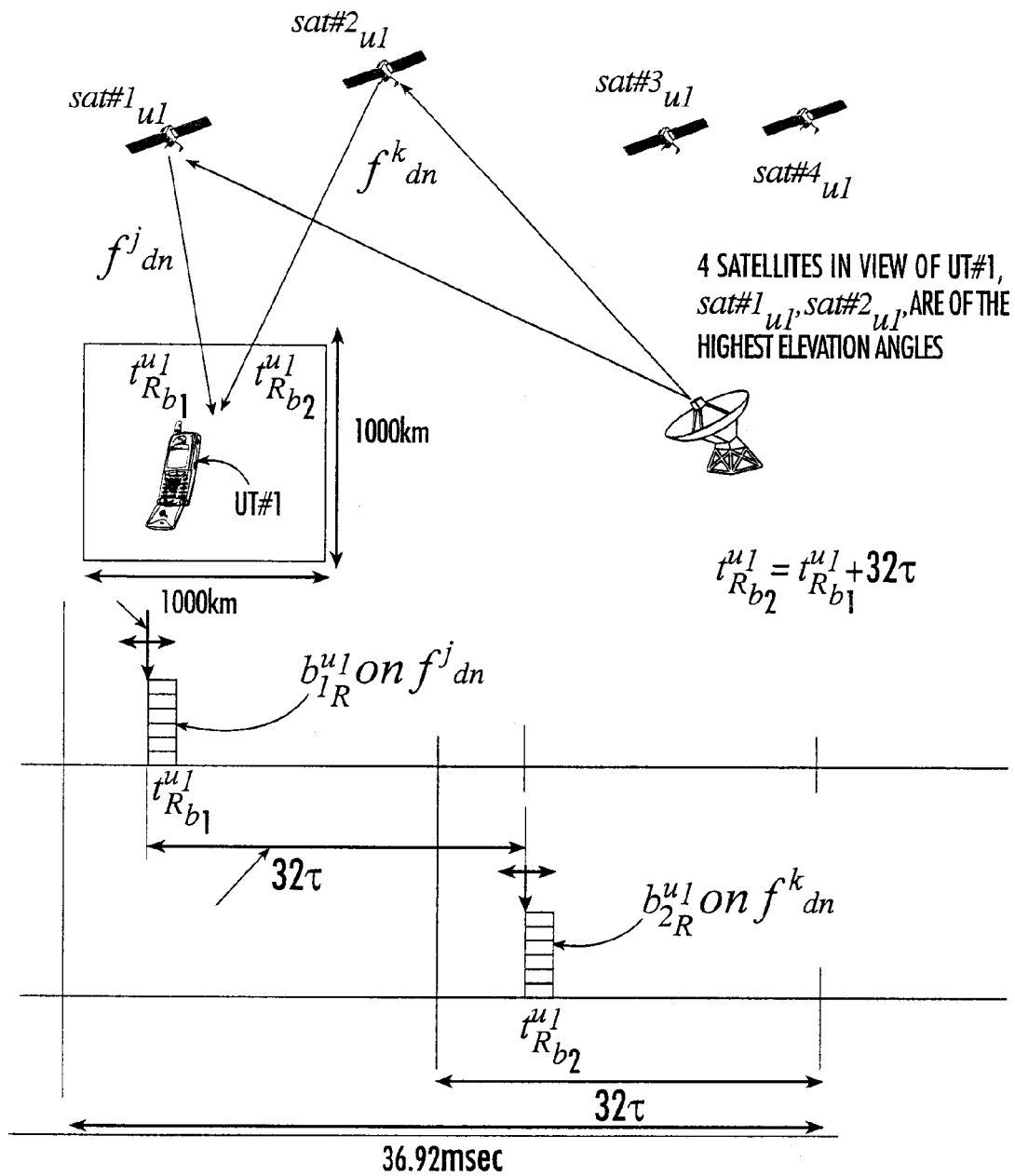
FIG. 2 illustrates timing between two downlink bursts received at a user terminal located at a Time Alignment Center for downlink diversity operation according to the present invention.
Figure 3:
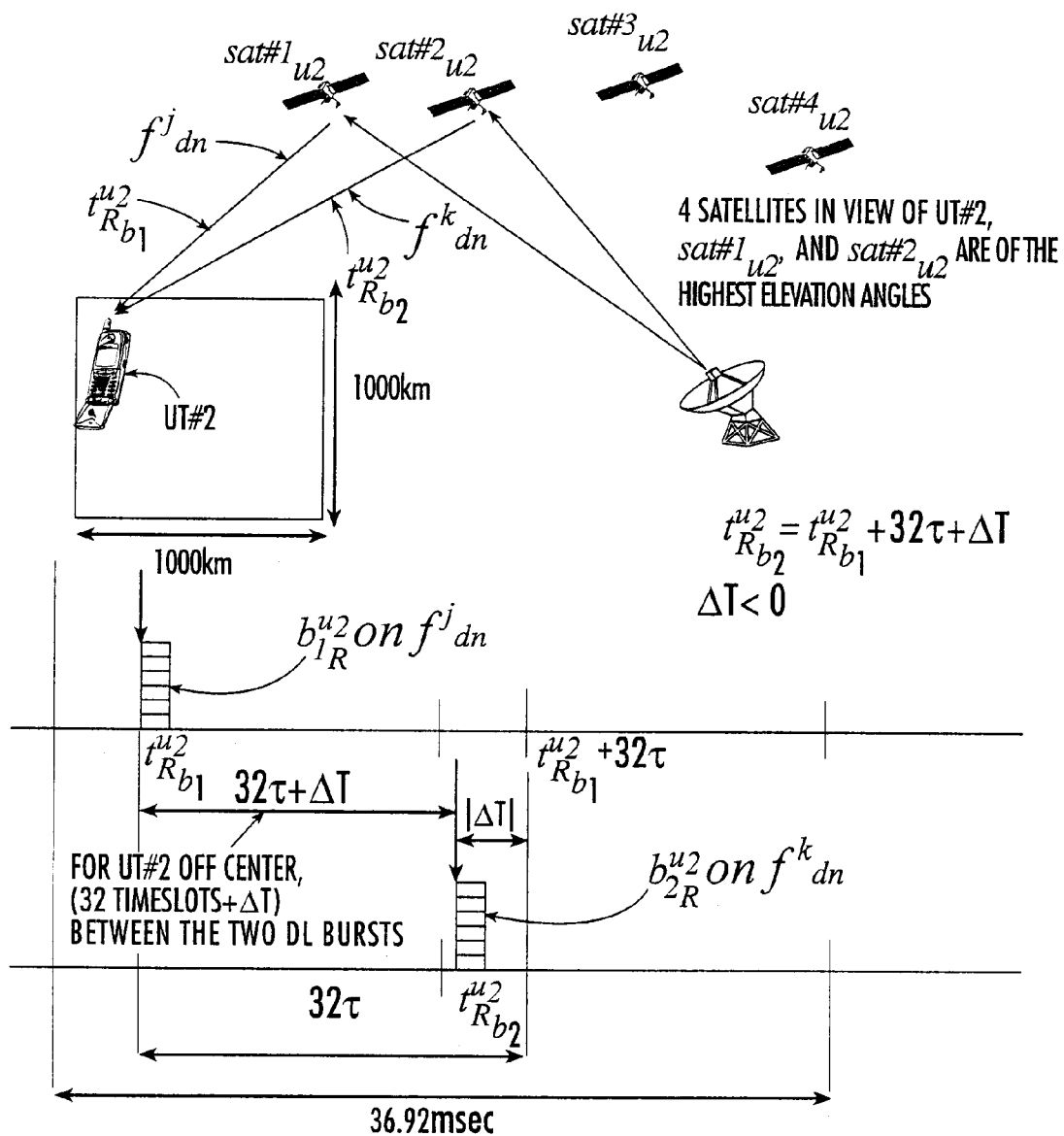
FIG. 3 illustrates timing between two downlink bursts received at a user terminal located off the Time Alignment Center for downlink diversity operation, where $\Delta T$ is less than 0 according to the present invention.
Figure 4:
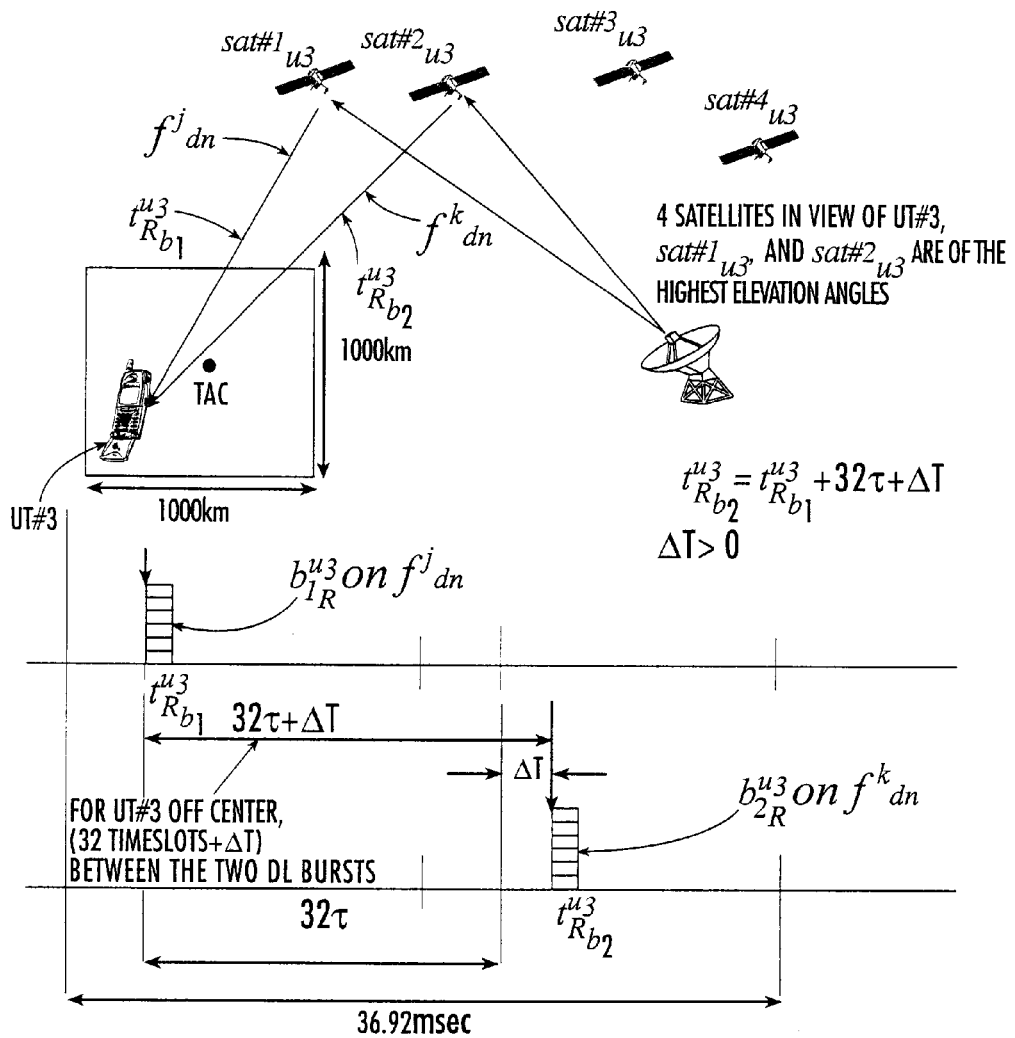
FIG. 4 illustrates timing between two downlink bursts received at a user terminal located off the Time Alignment Center for downlink diversity operation, where $\Delta T$ is greater than 0 according to the present invention.

By design, for a user located at the center of a DL region, there is a fixed time delay between $b_{1_R}^{u_i}$ and $b_{2_R}^{u_i}$ regardless of the satellite's positions. An illustration of this scenario is shown in FIG. 2. It is assumed that UTs are operating at the eighth rate GSM mode. That is, a DL frame has 64-DL timeslots with 36.92 msec duration time. FIG. 2 illustrates the case of a user terminal (UT#1) located at the center (TAC) of a DL region receiving $b_{1_R}^{u_1}$ on $f_{dn}^j$ at time $t_{R_{b1}}^{u_1}$ through sat#$1_{u_1}$ and exactly 32-DL timeslots (32τ or 18.46 msec) later receiving $b_{2_R}^{u_1}$ on $f_{dn}^k$ at time $t_{R_{b2}}^{u_1}$ through sat#$2_{u_1}$. Although there are 4 satellites in view of UT#1, the ground station selected sat#$1_{u_1}$ and sat#$2_{u_1}$ for forward link diversity operation as shown in the figure. However, a user terminal located off the center of a DL region receives the second DL burst through the second best satellite in view relative to the first DL burst by a shorter or a longer time than the 32-DL timeslots. FIGS. 3 and 4 show the case of a user terminal (UT#i, i=2 in FIG. 3 and i=3 in FIG. 4) at a location other than the center of a DL region receiving $b_{1_R}^{u_i}$ on $f_{dn}^j$ at time $t_{R_{b1}}^{u_i}$ through sat#$1_{u_i}$. The same UT receives $b_{2_R}^{u_i}$ delayed relative to $b_{1_R}^{u_i}$ by 32-DL timeslots+$\Delta T$, where $\Delta T$ can be positive or negative depending on the user's location with respect to the TAC of the DL region. FIGS. 3 and 4 describe the DL burst reception timing ($t_{R_{b2}}^{u_i}$) at UT#i through sat#$2_{u_i}$ for $\Delta T<0$ and $\Delta T>0$ respectively. A technique for calculating $\Delta T$ now will be provided.

Transmission from multiple satellites using multiple carriers to the same DL region are time coordinated to a point in the center of the DL region that is called the Time Alignment Center (TAC). By system design, a user located at the TAC receives $b_{1_R}^{u_i}$ through sat#$1_{u_i}$ and exactly 32τ later receives $b_{2_R}^{u_i}$ through sat#$2_{u_i}$. Thus:

$$t_{R_{b2}}^{u_{ic}} = t_{R_{b1}}^{u_{ic}} + 32\tau, \tag{1}$$

where, $t_{R_{b2}}^{u_{ic}}$=The time $b_{2_R}^{u_{ic}}$ is received at a user located at the TAC through sat#$2_{u_{ic}}$; and $t_{R_{b1}}^{u_{ic}}$=The time $b_{1_R}^{u_{ic}}$ is received at a user located at the TAC through sat#$1_{u_{ic}}$.

A UT located off the TAC (UT#i) receives $b_{1_R}^{u_i}$ separated by $b_{2_R}^{u_i}$ by a longer or a shorter time than 32τ depending on position. For example, the differential propagation delays between a user at the TAC and UT#i through sat#$1_{u_i}$ and sat#$2_{u_i}$ are shown in FIG. 4 and are indicated below;

$$\Delta T_{R_{b1}}^{u_i,u_{ic}} = t_{R_{b1}}^{u_i} - t_{R_{b1}}^{u_{ic}}; \text{ and} \tag{2}$$

$$\Delta T_{R_{b2}}^{u_i,u_{ic}} = t_{R_{b2}}^{u_i} - t_{R_{b2}}^{u_{ic}}; \tag{2}$$

where, $\Delta T_{R_{b1}}^{u_i,u_{ic}}$=The differential propagation delay of transmitted burst from sat#$1_{u_i}$ to UT#i (located off the TAC) and from sat#$1_{u_i}$ to a user located at the TAC;

$\Delta T_{R_{b2}}^{u_i,u_{ic}}$=The differential propagation delay of transmitted burst from sat#$2_{u_i}$ to UT#i (located off the TAC) and from sat#$2_{u_i}$ to a user located at the TAC;

$t_{R_{b1}}^{u_i}$=The time $b_{1_R}^{u_i}$ is received to UT#i (located off the TAC) through sat#$1_{u_i}$; and $t_{R_{b2}}^{u_i}$=The time $b_{2_R}^{u_i}$ is received to UT#i (located off the TAC) through sat#$2_{u_i}$.

Substituting equations (2) and (3) into equation (1), produces:

$$\begin{aligned} t_{R_{b2}}^{u_i} &= t_{R_{b1}}^{u_i} + 32\tau + \left(\Delta T_{R_{b2}}^{u_i,u_{ic}} - T_{R_{b1}}^{u_i u_{ic}}\right) \\ &= t_{R_{b1}}^{u_i} + 32\tau + \Delta T, \end{aligned} \tag{4}$$

where $\Delta T = \Delta T_{R_{b2}}^{u_i,u_{ic}} - \Delta T_{R_{b1}}^{u_i,u_{ic}}$ determine the time of reception of the second DL burst $b_{2_R}^{u_i}$ to the user through sat#$2_{u_i}$ to be shorter or longer than 32-DL timeslot delayed from the time the first burst was received via sat#$1_{u_i}$.

The term $\Delta T$ can be positive or negative depending on the user's position and the position of the two visible satellites with respect to the TAC. Equation (4) shows the start reception timing of the DL burst $b_{2_R}^{u_i}$ at UT#i through sat#$2_{u_i}$.

Figure 5:
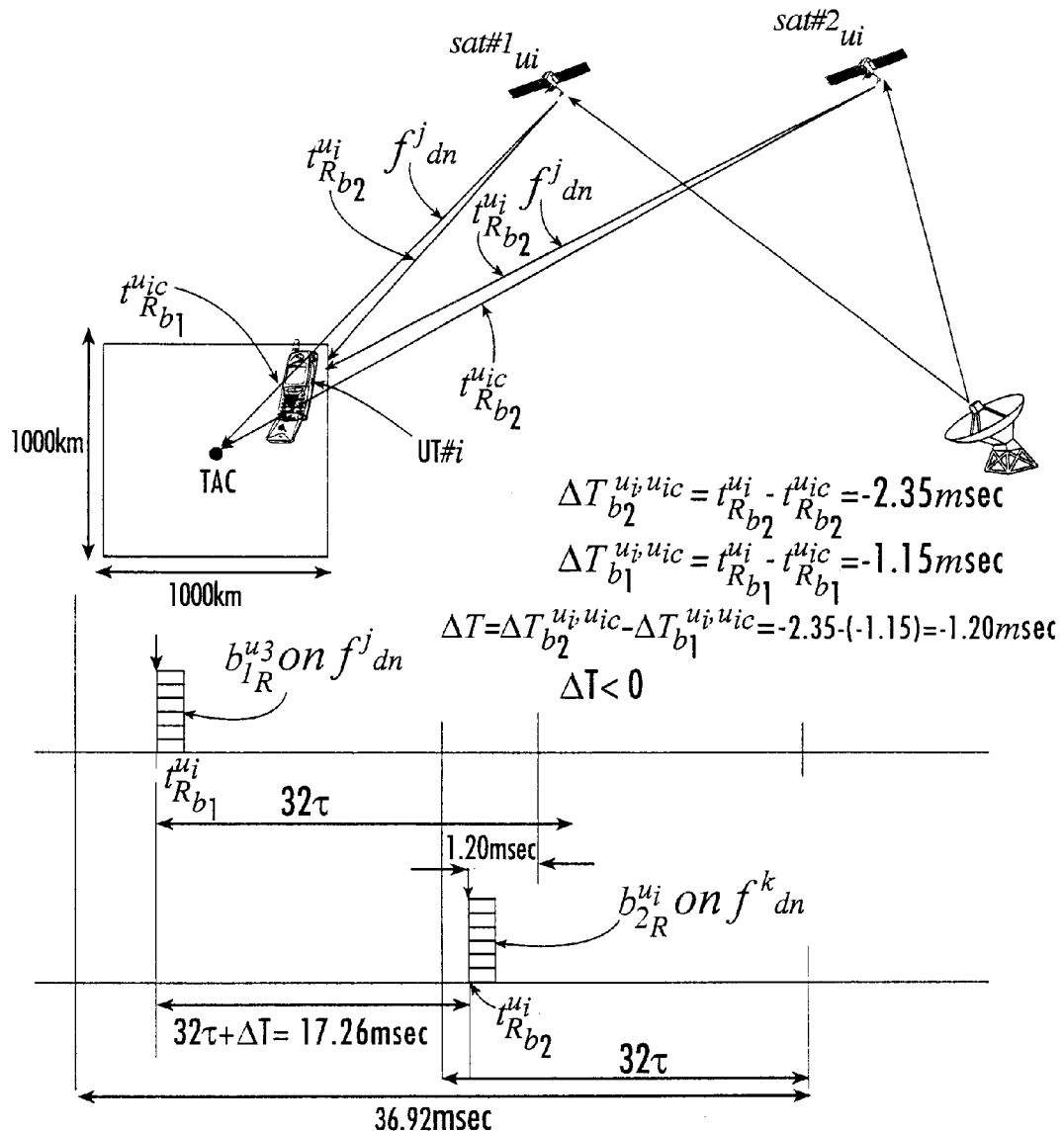
FIG. 5 illustrates timing between two downlink bursts received at a user terminal located at the northeast corner of the downlink region according to the present invention.

FIG. 5 shows an example illustrating the timing concept. The 707 km between UT#i and the TAC in the figure is the largest distance in the 500 km×500 km UL region. It implies a worst case propagation delay difference of 2.35 msec (4-DL timeslot) assuming that the satellite is near the horizon. FIG. 5 shows user (UT#i) located in the northeast corner of a DL region having sat#$1_{u_i}$ and sat#$2_{u_i}$ as the best two visible satellites for forward link diversity operation. It is assumed that sat#$2_{u_i}$ positioned near the eastern horizon, with $\Delta T_{R_{b2}}^{u_i,u_{ic}}=-2.35$ msec and sat#$1_{u_i}$ positioned as its shown in the figure with $\Delta T_{R_{b1}}^{u_i,u_{ic}}=-1.15$ msec. Using equation (4), the DL burst $b_{2_R}^{u_i}$ received at UT#i through sat#$2_{u_i}$ is delayed by 17.26 msec from the DL burst $b_{1_R}^{u_i}$ received through sat#$1_{u_i}$ as is indicated. During that time UT#i transmits UL burst and the synthesizer is resetting twice.

Therefore, the differential delays between UT#i and a user at the TAC through sat#$1_{u_i}$ and sat#$2_{u_i}$ are in general bounded by:

$$|\Delta T_{R_{b1}}^{u_i,u_{ic}}| \leq 2.35 \text{ m sec;} \quad (5)$$

$$|\Delta T_{R_{b2}}^{u_i,u_{ic}}| \leq 2.35 \text{ m sec;} \quad (6)$$

and $$|\Delta T| \leq 4.70 \text{ m sec.} \quad (7)$$

Equations (4) and (7) imply that the time between $b_{1_R}^{u_i}$ and $b_{2_R}^{u_i}$ to a user located off the TAC of 1000 km×1000 km region is always greater than 13.76 msec (24-DL timeslot) and less than 23 msec (40-DL timeslot). During that time a user preferably transmits an UL burst (2.3 msec) which is 4 times larger than the DL burst (0.577 msec) and the synthesizer resets twice. A detailed analysis of user's transmit burst timing is described below. In a typical scenario with the conventional synthesizer technology, each synthesizer's reset is upper bounded by 0.5 msec.

In summary, in the worst case scenario of a user's position with respect to the TAC, there is enough time for the user terminal to transmit and also for the synthesizer to reset between the reception of the two DL bursts. Therefore, forward and return link diversity operation always may be achieved.

Figure 6:
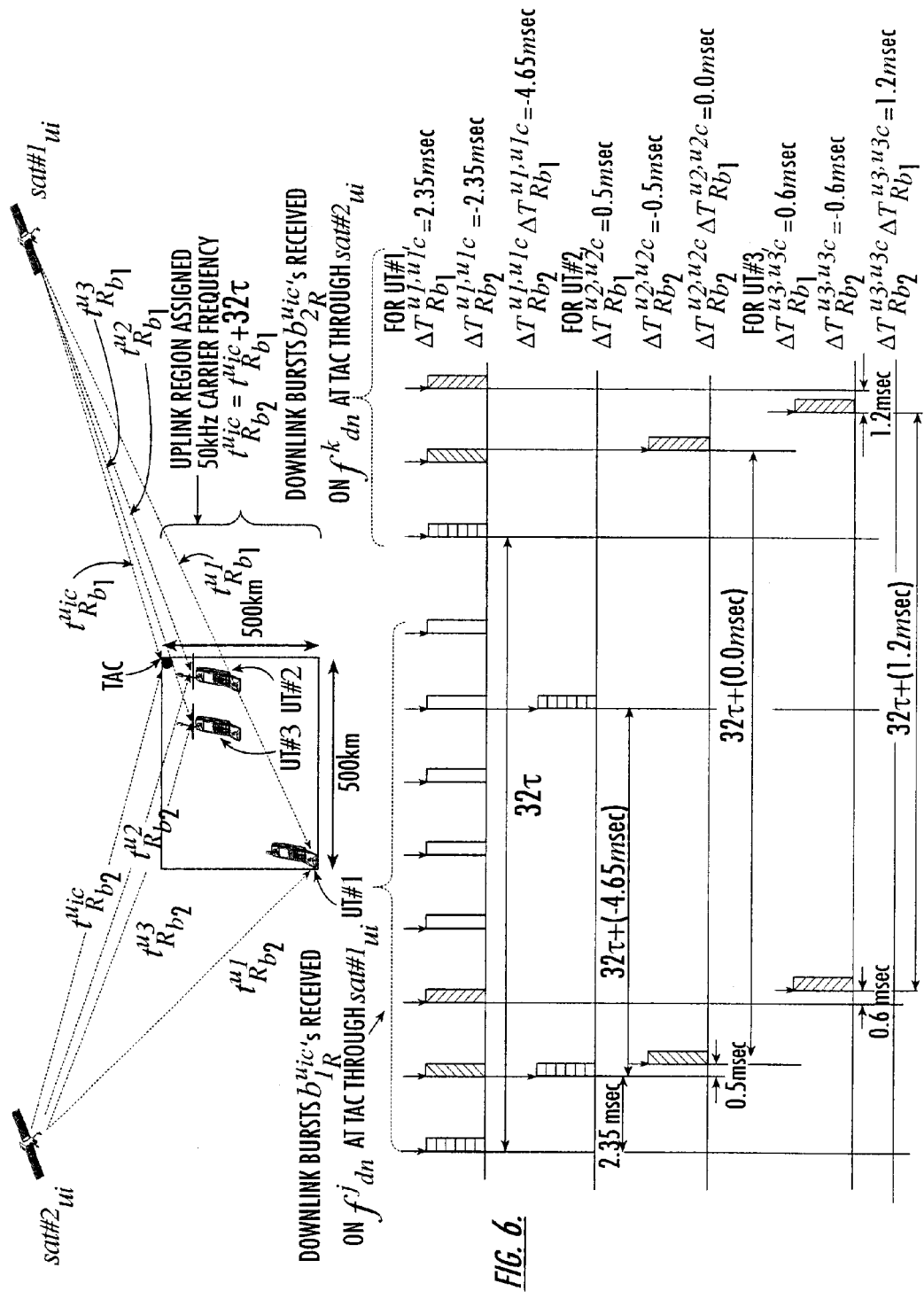
FIG. 6 illustrates forward link burst timing for worst case user terminal distributions.

The example in FIG. 6 demonstrates one of the worst cases that can occur. The two selected satellites serving a group of scattered UTs within 500 km×500 km region are located at the opposite sides of the horizon and are defined as sat#$1_{u_i}$ and sat#$2_{u_i}$. The served UL region is the southwest quarter of a 1000 km×1000 km DL region where the TAC is located at the northeast corner of the UL region as shown in the figure. There are three scattered users within the defined UL region and are indicated as UT#i, where $1 \leq i \leq 3$. The term $t_{R_{b1}}^{u_i}$ indicates the time DL bursts $b_{1_R}^{u_i}$ (start of the burst) is received at the UTs through sat#$1_{u_i}$. The time DL bursts $b_{2_R}^{u_i}$ (start of the burst) is received at UT#i through sat#$2_{u_i}$ is indicated in the figure as $t_{R_{b2}}^{u_i}$. In addition, $t_{R_{b1}}^{u_{ic}}$ and $t_{R_{b2}}^{u_{ic}}$ indicate the time $b_{1_R}^{u_i}$ and $b_{2_R}^{u_i}$ are received through sat#$1_{u_i}$ and sat#$2_{u_i}$ at the TAC respectively.

The top burst structure in FIG. 6 shows the time $b_{1_R}^{u_i}$ and $b_{2_R}^{u_i}$ are received at the TAC through sat#$1_{u_i}$ and sat#$2_{u_i}$ respectively. It can be seen that the DL burst #s are 1, 5, 9, . . . , up to $b_{1_R}^{u_i}$ #61 received to the UTs on carrier frequency $f_{dn}^j$ through sat#$1_{u_i}$, where $b_{2_R}^{u_i}$ are the DL burst #'s 33, 37, 41, . . . , up to $b_{2_R}^{u_i}$ #29 of the next frame received to the same UTs on another carrier frequency $f_{dn}^k$ through sat#$2_{u_i}$. It can also be seen that at the TAC, the time between $b_{1_R}^{u_{ic}}$ and $b_{2_R}^{u_{ic}}$ is 32-DL timeslot (18.46 msec or 32τ) as shown in the top burst structure of the figure. It is observed that UT#1 is located at the diagonal corner (about 700 km) from the TAC. With sat#$1_{u_i}$ near the eastern horizon, this corresponds to a delay of 2.35 msec from the TAC at UT#1 ($\Delta T_{R_{b1}}^{u_1,u_{1c}}=2.35$ msec).

$$t_{R_{b1}}^{u_1}=t_{R_{b1}}^{u_{1c}}+2.35 \text{ m sec,} \quad (8)$$

where, $t_{R_{b1}}^{u_1}$=The time DL burst $b_{1_R}^{u_1}$ is received at UT#1 through sat#$1_{u_1}$; and $t_{R_{b1}}^{u_{1c}}$=The time DL burst $b_{1_R}^{u_1}$ is received at TAC through sat#$1_{u_1}$.

According to equation (4), the DL burst ($b_{2_R}^{u_1}$) is received at UT#1 through sat#$2_{u_1}$, where sat#$2_{u_1}$ is assumed to be near the western horizon, for forward link diversity operation, where $\Delta T_{R_{b2}}^{u_1,u_{1c}}=-2.35$ msec. Details of the timing analysis for UT#1 is shown in the second burst structure of FIG. 6. Thus, $$t_{R_{b2}}^{u_1}=t_{R_{b1}}^{u_1}+32\tau+(-2.35 \text{ m sec}-2.35 \text{ m sec}), \quad (9)$$

where, $t_{R_{b2}}^{u_1}$=The time DL burst $b_{2_R}^{u_1}$ is received at UT#1 through sat#$2_{u_1}$.

Similarly, UT#2 is located at 150 km south of the TAC and about 550 km away from UT#1. With sat#$1_{u_2}$ near the eastern horizon, this corresponds to a delay at UT#2 of 0.5 msec from the TAC, i.e., ($\Delta T_{R_{b1}}^{u_2,u_{2c}}=0.5$ msec). Thus, $$t_{R_{b1}}^{u_2}=t_{R_{b1}}^{u_{2c}}+0.5 \text{ m sec,} \quad (10)$$

where, $t_{R_{b1}}^{u_2}$=The time DL burst $b_{1_R}^{u_2}$ is received at UT#2 through sat#$1_{u_2}$; and $t_{R_{b1}}^{u_{2c}}$=The time DL burst $b_{1_R}^{u_2}$ is received at TAC through sat#$1_{u_2}$.

The time DL burst $b_{2_R}^{u_2}$ is received at UT#2 through sat#$2_{u_2}$ also is calculated from equation (4) where, UT#2 is almost at the same distance from both satellites and $\Delta T_{R_{b2}}^{u_2,u_{2c}}=0.5$ msec. Details of the timing analysis for UT#2 is shown in the third burst structure of FIG. 6. Thus, $$t_{R_{b2}}^{u_2}=t_{R_{b1}}^{u_2}+32\tau+(0.5 \text{ m sec}-0.5 \text{ m sec}). \quad (11)$$

Similarly, UT#3 is located at 180 km southwest of the TAC and about 150 km away from UT#2. With sat#$1_{u_3}$ near the eastern horizon, this corresponds to a delay of 0.6 msec from the TAC at UT#3 ($\Delta T_{R_{b1}}^{u_3,u_{3c}}=0.6$ msec). Thus, $$t_{R_{b1}}^{u_3}=t_{R_{b1}}^{u_{3c}}+0.6 \text{ m sec}). \quad (12)$$

where, $t_{R_{b1}}^{u_3}$=The time DL burst $b_{1_R}^{u_3}$ is received at UT#3 through sat#$1_{u_3}$; and $t_{R_{b1}}^{u_{3c}}$=The time DL burst $b_{1_R}^{u_3}$ is received at TAC through sat#$1_{u_3}$.

The time the DL burst $b_{2_R}^{u_3}$ is received at UT#3 through sat#$2_{u_3}$ also is calculated from equation (4) where, $\Delta T_{R_{b2}}^{u_3,u_{3c}}=-0.6$ msec. The detail of the timing analysis for UT#3 is shown in the fourth burst structure of FIG. 6. Thus, $$t_{R_{b2}}^{u_3}=t_{R_{b1}}^{u_3}+32\tau+(-0.6 \text{ m sec}-0.6 \text{ m sec}). \quad (13)$$

It is indicated in FIG. 6 that each UT receives two bursts per 64-DL timeslot frame from the two visible satellites on two different timeslots and frequencies with enough time between the received bursts for the user to transmit and also for the synthesizer to switch back and forth. Therefore, forward link diversity operation can be accomplished successfully by combining user's received successive bursts.

Figure 7:
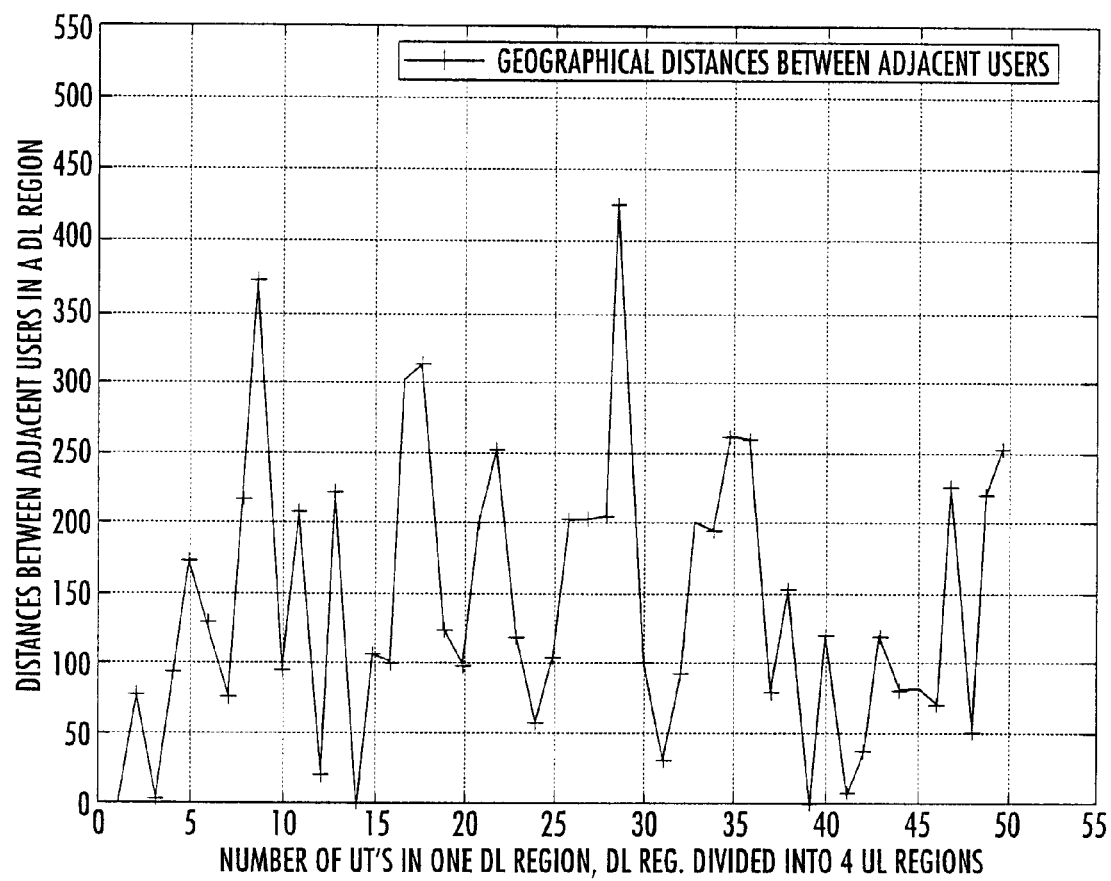
FIG. 7 graphically illustrates distances between adjacent users in a 1000 km×1000 km downlink region.

The present invention has been simulated for a LEO system using Globalstar parameters over the continental United States. FIG. 7 shows the distances between adjacent (in time) users randomly located in a 1000 km×1000 km DL region versus the number of users within that region. The limit of 51 users shown in the figure instead of 64 users typical of eighth rate GSM, is due to the fact that those users are served in diversity mode in both links. In other words, if the concern were the diversity operation in the forward link only, then the served number of users could have been 64 UT. The 51 users shown in the figure are served by two 200 kHz DL carrier frequencies through the best two visible satellites for forward link diversity operation and by four different 50 kHz UL carriers for return link diversity operation through all visible satellites.

Figure 8:
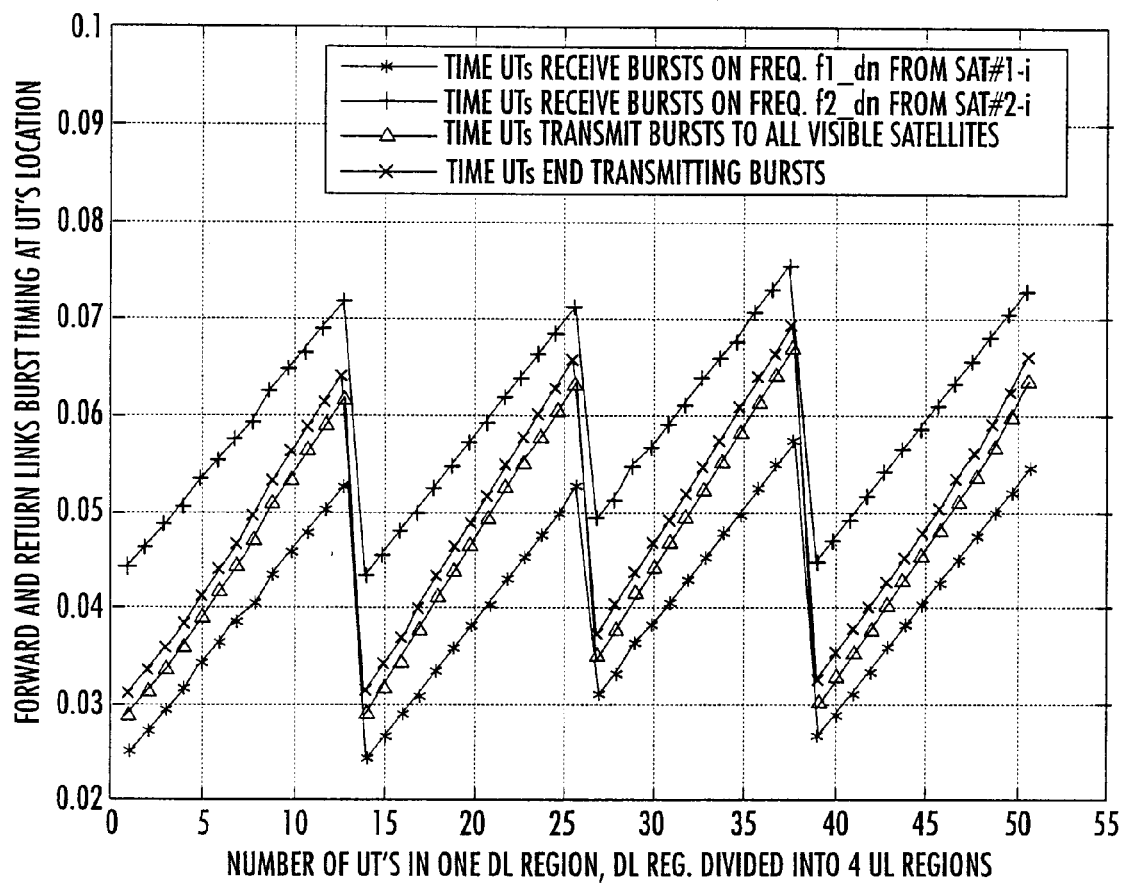
FIG. 8 graphically illustrates forward and return link burst timing at user terminal locations within a 1000 km×1000 km downlink region.

FIG. 8 illustrates timing of the two-DL successive bursts received at each user through the best two visible satellites. There are four separate vertical zones in the figure identifying the four 50 kHz UL carriers. The lowest curve in the figure indicates the start of reception timing of the first DL burst $t_{R_{b1}}^{u_i}$ to each user terminal through sat#$1_{u_i}$ on the DL carrier frequency (200 kHz) $f_{dn}^{j}$. The highest curve in the figure indicates the start of reception timing of the second DL burst $t_{R_{b2}}^{u_i}$ to each user terminal through sat#$2_{u_i}$ on the DL carrier frequency (200 kHz) $f_{dn}^{k}$. The two middle curves show the start and the end of UL burst transmission for each user terminal.

As can be seen from FIG. 8, all users are operating successfully in diversity mode in the forward link. This implies that each UT receives two bursts per frame from the two visible satellites on two different carriers and successfully transmits one burst per frame between the reception of both bursts with enough time for the synthesizer to reset. Moreover, the number of UTs per each 50 kHz carrier is between 12 and 13 users. This is due to the GT between transmitted bursts to avoid collision at any of the visible satellites. It will be understood that the bandwidth used in the return link for the 51 users (four 50 kHz UL carriers) is half the bandwidth used in the forward link (two 200 kHz DL carriers). Therefore, if the same bandwidth is used in both links, a capacity of 64 users per each 1000 km×1000 km DL region can be achieved with fill diversity operation in both links.

Return Link Diversity

Uplink or return link diversity systems and methods according to the present invention now will be described. Additional details may be found in the cross-referenced related application.

In the uplink or return link, each User Terminal (UT) preferably transmits only one burst per frame. The transmitted bursts of users served by the same return link carrier are received in a non-overlapping fashion, preferably by all visible satellites. The ground station receives each user's bursts through the visible satellites and can use a suitable diversity technique to combine those bursts. Full diversity benefits may be obtained from all visible satellites while allowing extended battery life in the UTs. In order to accommodate this concept, a Guard Time (GT) between transmitted bursts is provided, preferably to ensure that return link bursts are not colliding at any visible satellites. A guard time is maintained between adjacent (in time) transmitted bursts of users served by the same return link carrier at the user's locations. Therefore, return link diversity operation through all visible satellites can be achieved successfully.

The GT preferably depends on the uplink region sizes and the geometry of the satellites. In this analysis, an LEO system is considered as an example. However, the concept can be extended to other TDMA LEO, MEO or GEO systems with minor changes in the parameters. Computer simulations showed that a GT of 2-forward link bursts duration between the transmitted uplink (UL) bursts is enough to prevent burst collisions at all visible satellites. This outcome is based on the considered LEO system for users served by the same return link carrier frequency distributed randomly in a 500 km by 500 km region.

Figure 9:
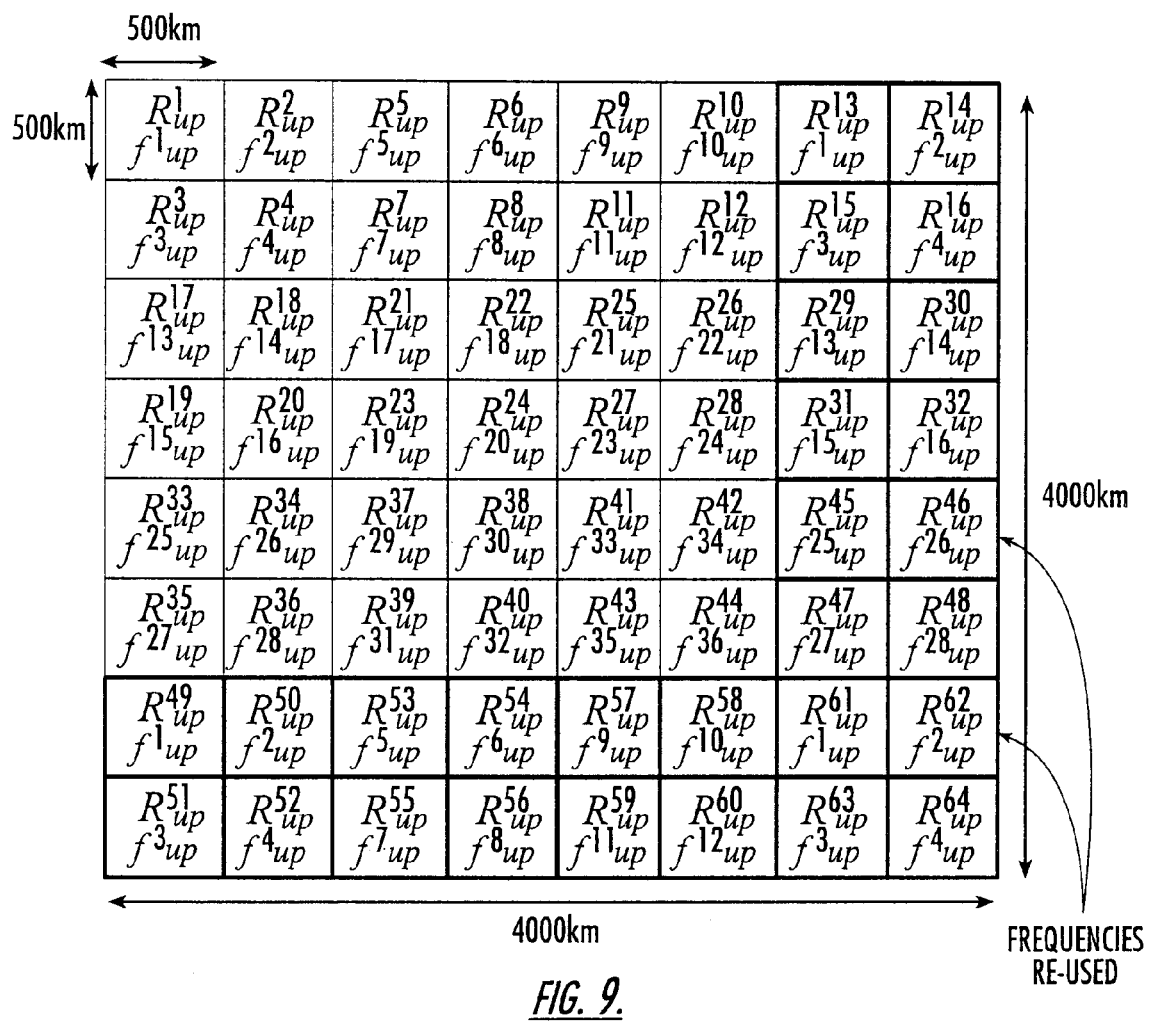
FIG. 9 illustrates uplink regions with uplink carrier frequencies.

The present detailed description is based on a Region Oriented Frequency Assignment (ROFA) scheme where the carrier frequencies are assigned to the geographical locations. As was described in FIG. 1, in order to investigate the diversity operation in the return link for a TDMA LEO system, the Continental United States including South Canada and North Mexico were selected and called CONUS as an example that can be generalized over the globe. As shown in FIG. 1, the region is divided into 16 (1000 km by 1000 km) downlink (DL) regions. As shown in FIG. 9, each DL region is divided into 4 (500 km by 500 km) uplink (UL) regions.

Users in each UL region transmit a single burst per frame to all visible satellites on a 50 kHz return link carrier frequency. Different 50 kHz carriers serve different UL regions as shown in FIG. 9 where $R_{up}^{i}$ and $f_{up}^{i}$ indicate the uplink region number (i) and the return link carrier number (i) respectively. FIG. 9 also shows a frequency reuse of the spectrum in such a way that UTs located in regions reusing the same frequencies are served by different forward link satellite beams and also different return link satellite beams. For example, in FIG. 1, UTs located in DL region #4 ($R_{dn}^{4}$) use the same carriers of UTs located in DL region #1 ($R_{dn}^{1}$). However, UTs in $R_{dn}^{4}$ are served by different forward link beams than UTs in $R_{dn}^{1}$ due to the 2000 km spacing between both regions. The same reuse principle is applied in the return link with all reused frequencies shown in the bold regions of FIG. 9.

User transmissions are based on the reception of their first bursts (starting time) through the best satellite in view. A user receives two forward link bursts from the two visible satellites and is expected to transmit to all visible satellites during a period between the two successive receptions. The UT's burst transmission may be placed between the two burst receptions to avoid simultaneous transmission and reception in the user terminal. This can avoid the need for a duplexer while still permitting bi-directional information flow. Transmission from multiple satellites using multiple carriers to the same DL region are time coordinated to a point in the center of the DL region, which is called the Time Alignment Center (TAC).

Assuming for simplicity that users are distributed very close to each other and also are very close to the center of a DL region. It is assumed that UTs are operating in the eighth rate GSM mode, i.e., a DL frame has 64-DL timeslots with a frame during time of 36.92 msec. Each DL region is divided into 4 UL regions. For example, the 4 UL regions can be defined as $R_{up}^{1}$, $R_{up}^{2}$, $R_{up}^{3}$, and $R_{up}^{4}$. UTs located in $R_{up}^{1}$ receive DL bursts $b_{1_R}^{u_i}$ #1, 5, 9, ..., up to $b_{1_R}^{u_i}$ #61 on carrier frequency $f_{dn}^{j}$ through sat#$1_{u_i}$ and receive DL bursts $b_{2_R}^{u_i}$ #33, 37, 41, ..., up to $b_{2_R}^{u_i}$ #29 of the next frame on another DL carrier frequency $f_{dn}^{k}$ through sat#$2_{u_i}$. UTs located in $R_{up}^{2}$ receive $b_{1_R}^{u_i}$ #2, 6, 10, ..., up to $b_{1_R}^{u_i}$ #62 through sat#$1_{u_i}$ and receive $b_{2_R}^{u_i}$ #34, 38, 42, ..., up to $b_{2_R}^{u_i}$ #30 of the next frame through sat#$2_{u_i}$. UTs located in $R_{up}^{3}$ receive $b_{1_R}^{u_i}$ #3, 7, 11, ..., up to $b_{1_R}^{u_i}$ #63 through sat#$1_{u_i}$ and receive $b_{2_R}^{u_i}$ #35, 39, 43, ..., up to $b_{2_R}^{u_i}$ #31 of the next frame through sat#$2_{u_i}$. Finally, UTs located in $R_{up}^4$ receive $b_{1_R}^{u_i}$ #4, 8, 12, ..., up to $b_{1_R}^{u_i}$ #64 through sat#$1_{u_i}$ and receive $b_{2_R}^{u_i}$ #36, 40, 44, ..., up to $b_{2_R}^{u_i}$ #32 of the next frame through sat#$2_{u_i}$. The above methodology is illustrated in FIG. 10.

Figure 10:
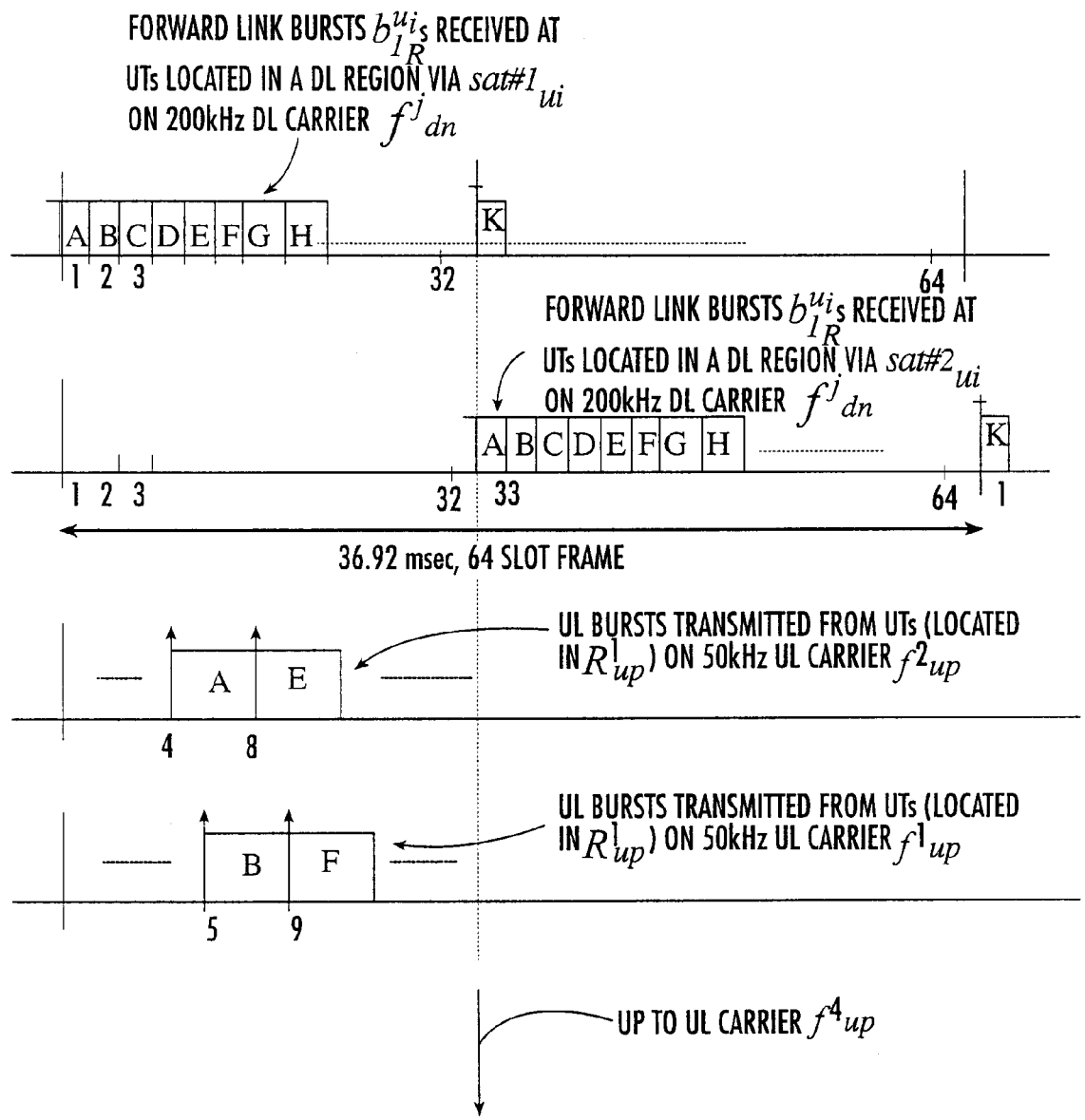
FIG. 10 is a timing diagram illustrating forward and return link burst timing according to the present invention.

The top burst structure of FIG. 10 shows $b_{1_R}^{u_i}$ A, B, ... up to $b_{1_R}^{u_i}$ #32 received at the user's locations on a DL carrier (200 kHz) $f_{dn}^j$ through sat#$1_{u_i}$. The second set of (diversity) DL bursts are received at the UTs on timeslots 33, 34, ..., up to 64 on another DL carrier (200 kHz) $f_{dn}^k$ through sat#$2_{u_i}$ as is indicated in the second burst structure from the top of FIG. 10. The third burst structure from the top of FIG. 10 shows UL burst timing for UTs located in $R_{up}^1$. It is shown that UL burst transmissions (start and end) are between the reception of $b_{1_R}^{u_i}$ and $b_{2_R}^{u_i}$ via sat#$1_{u_i}$ and sat#$2_{u_i}$ respectively. The remaining part of FIG. 10 shows UL burst timing for users located in other UL regions of the same DL region.

The present invention preferably incorporates a fixed offset (delay) between the reception (by the UT) of diversity burst one and the transmission of the return link burst by the UT. This fixed time offset preferably is selected to be 7τ (seven downlink burst slots).

Stated differently, the time delay between the UT's first received burst $b_{1_R}^{u_i}$ and its transmitted burst $b_T^{u_i}$ may be divided into two parts, a fixed delay and an adjustable delay. For example, the fixed delay (in the case of 500 km by 500 km UL region) can include the forward link burst duration (0.577 msec), the synthesizer reset time (0.5 msec), and the maximum possible advance/retard time (2.35 msec in the worst case for 500 km by 500 km region). The total fixed delay can be 3.43 msec, which is about 6-DL timeslots. In this analysis, the fixed delay is assumed to be 7-DL timeslots as an extra precaution. For other UL regions of different sizes, the fixed delay might be different but the technique can be the same. The adjustable delay is divided into two parts. The first part depends on the UT's position, which is the geographical distance between adjacent (in time) UTs divided by the speed of light. The second part is the actual advance/retard time of the UT. The adjustable delay varies and depends on each UT's location. The ground station transmits, for example, on a broadcast control channel (BCCH) the adjustable delay to the particular UT based on the knowledge of all UTs positions within the same UL carrier. Therefore, the UT determines the start transmit time of its own burst. This technique requires the ground station to have full knowledge of the exact locations of all UTs within the same UL carriers.

Figure 11A:
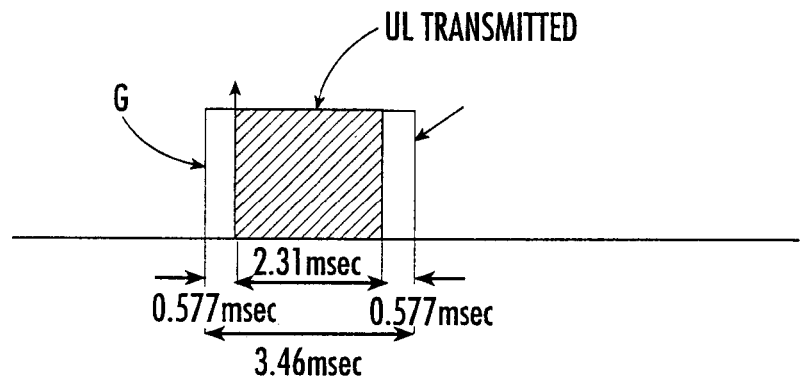
FIGS. 11A and 11B illustrate burst format for the uplink bursts according to the present invention.
Figure 11B:
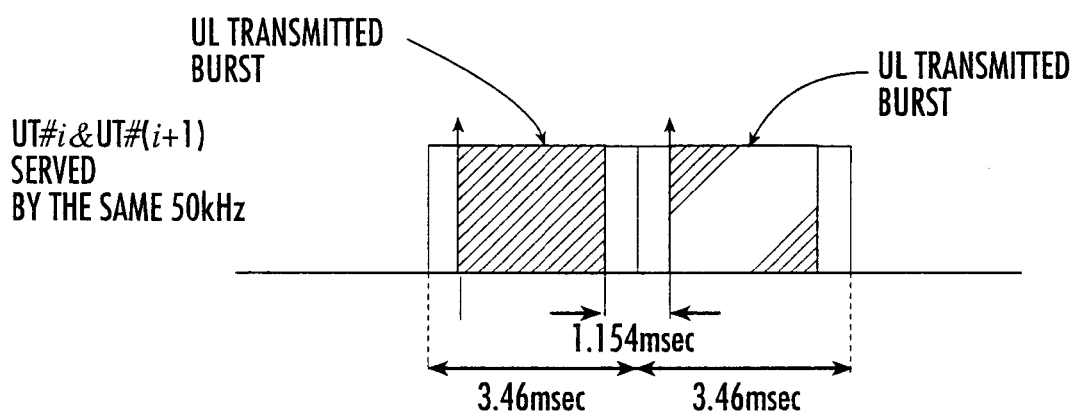

It is shown in FIG. 11A that the transmitted burst (2.31 msec) is set with a GT of 0.577 msec preceding and 0.577 msec precluding the UL burst. Therefore, the GT between any two transmitted bursts is 1.154 msec as shown is FIG. 11B. This technique is further explained via simulations and examples.

Figure 12:
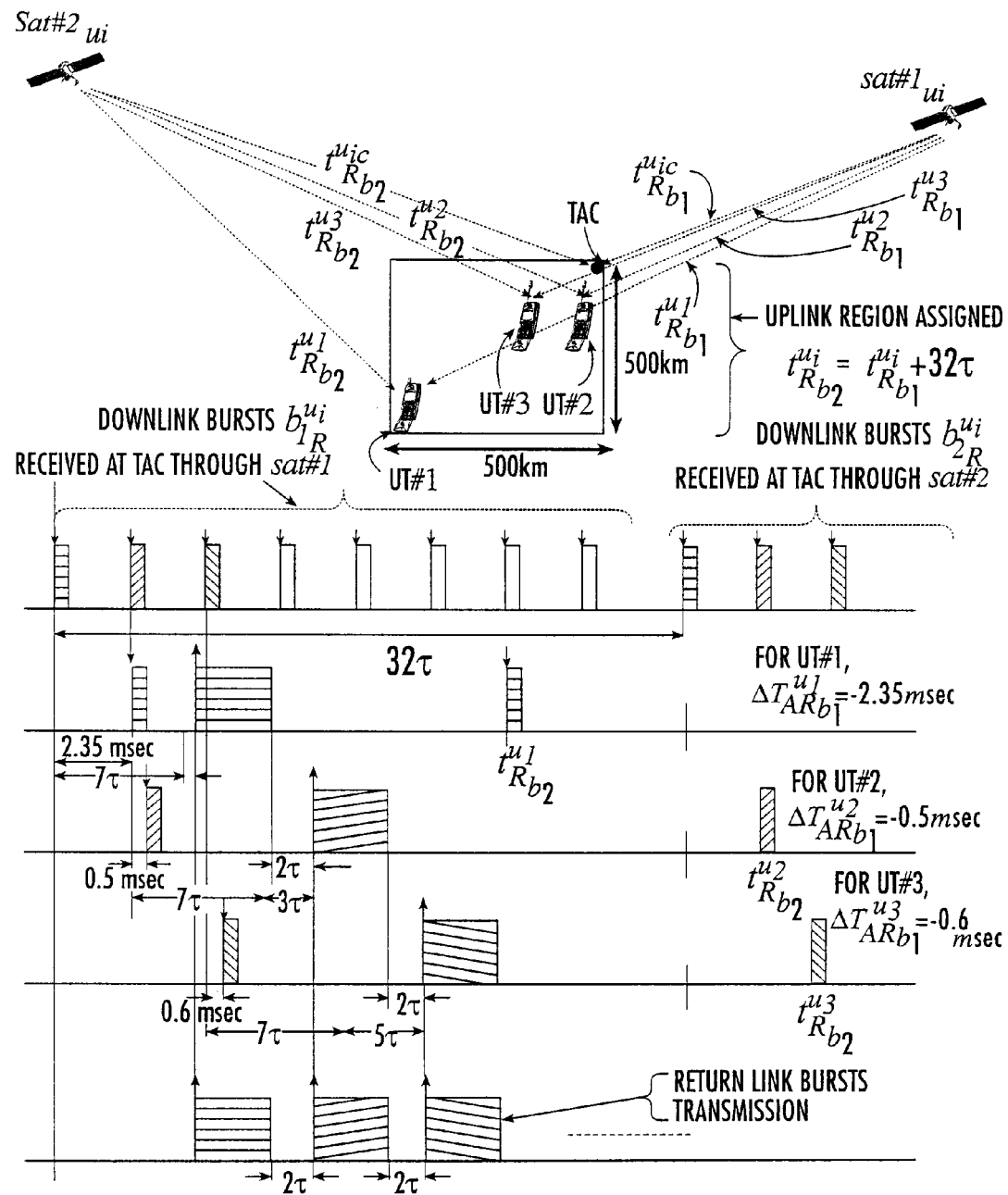
FIG. 12 is a timing diagram of forward and return link bursts according to the present invention.

FIG. 12 demonstrates one of the worst cases that can occur. The two selected satellites serving a group of scattered UTs within 500 km by 500 km region are located at the opposite sides of the horizon and are defined as sat#$1_{u_i}$ and sat#$2_{u_i}$. The served UL region is the southwest quarter of a 1000 km by 1000 km DL region where the TAC is located at the northeast corner of the UL region as shown in FIG. 12. There are three scattered users within the defined UL region and are indicated as UT#i, where $1 \leq i \leq 3$. The term $t_{R_{b1}}^{u_i}$ indicates the time DL bursts $b_{1_R}^{u_i}$ (start of the burst) are received at the UTs through sat#$1_{u_i}$. The time DL bursts $b_{2_R}^{u_i}$ (start of the burst) are received at the UTs through sat#$2_{u_i}$ is indicated in FIG. 12 as $t_{R_{b2}}^{u_i}$. The time the second burst is received at the UT through sat#$2_{u_i}$ is assumed to be delayed by a nominal amount of 32 forward link slots (32τ) from the time the first burst is received to the same UT. Therefore, the UT transmits an UL burst between the reception of the two successive bursts and the synthesizer switches back and forth. In addition, $t_{R_{b1}}^{u_{ic}}$ and $t_{R_{b2}}^{u_{ic}}$ indicate the time $b_{1_R}^{u_i}$ and $b_{2_R}^{u_i}$ are received through sat#$1_{u_i}$ and sat#$2_{u_i}$ at the TAC respectively.

The top burst structure in FIG. 12 shows the time $b_{1_R}^{u_i}$ and $b_{2_R}^{u_i}$ are received at the TAC through sat#$1_{u_i}$ and sat#$2_{u_i}$ respectively. It can be seen that $b_{1_R}^{u_i}$ are the DL burst's #s 1, 5, 9, ..., up to $b_{1_R}^{u_i}$ #61 on carrier frequency $f_{dn}^j$ through sat#$1_{u_i}$, where $b_{2_R}^{u_i}$ are the DL burst #33, 37, 41, ..., up to $b_{2_R}^{u_i}$ #29 of the next frame on another carrier frequency $f_{dn}^k$ through sat#$2_{u_i}$. It can also be seen that at the TAC, the time between $b_{1_R}^{u_{ic}}$ and $b_{2_R}^{u_{ic}}$ preferably is always (by design) 32-DL timeslots (18.46 msec or 32τ) as shown in the top burst structure of FIG. 12. It is observed that UT#1 is located at the diagonal corner (about 700 km) from the TAC. With sat#$1_{u_i}$ near the eastern horizon, this corresponds to a delay of 2.35 msec from the TAC at UT#1. The DL burst timing $t_{R_{b1}}^{u_1}$ at UT#1 through sat#$1_{u_1}$, the advance/retard time ($\Delta T_{AR_{b1}}^{u_1} = -2.35$ msec) required to align UT#1 transmit timing with respect to the TAC, and the fixed time delay of 7 DL timeslots (4.04 msec or 7τ) are similar to the technique described above.

There is one-DL timeslot (shown as τ in FIG. 12) preceding the UL transmitted burst that is shown for UT#1 in the second from the top burst structure of FIG. 12. Similarly, UT#2 is located at 150 km south of the TAC and about 550 km away from UT#1. With sat#$1_{u_2}$ near the eastern horizon, this corresponds to a delay at UT#2 of 0.5 msec from the TAC. For UT#2, in order to adjust its burst transmit time, the GT of the previous user has to be considered (in this case its 2τ of UT#1) in addition to the one-DL timeslot (τ) preceding its own transmitted burst. Therefore, UT#2 adjusts its burst transmit timing based on the advance/retard time ($\Delta T_{AR_{b1}}^{u_2} = -0.5$ msec), 7τ (fixed delay time), and 3τ (2τ GT of UT#1 and τ GT preceding its own transmitted burst) as is illustrated in the third burst structure of FIG. 12. Similarly, UT#3 is located at 180 km south west of the TAC and about 150 km away from UT#2. With sat#$1_{u_3}$ near the eastern horizon, this corresponds to a delay of 0.6 msec from the TAC. Therefore, UT#3 adjusts its burst transmit timing based on the advance/retard time ($\Delta T_{AR_{b1}}^{u_3} = -0.6$ msec), 7τ (fixed delay time), and 5τ (2τ GT of UT#1, 2τ GT of UT#2, and τ GT preceding its own transmitted burst) as indicated in the fourth burst structure of FIG. 12.

The last burst structure of FIG. 12 shows the timing between the transmitted bursts. It shows a fixed GT of 2τ between all transmitted bursts of scattered users in 500 km by 500 km region. Computer simulation results indicate that with (2τ) GT between transmitted bursts (of users served by the same 50 kHz carrier) there are no burst collisions at the plurality of the visible satellites for the simulated system. Therefore, diversity operation can be accomplished successfully in the return link.

Based on the example shown in FIG. 12, a general form for the transmitted burst timing (of users served by the same return link carrier) can be written as;

$$t_{T_b}^{u_n} = t_{R_{b1}}^{u_n} + \Delta T_{AR_{b1}}^{u_n} + 7\tau + (2n-1)\tau, \text{ for } n=1, 2, 3 \ldots$$

Constraint:

$$[(t_{T_b}^{u_n} + 5\tau) - t_{T_b}^{u_i}] \leq 64\tau, \tag{14}$$

where, $t_{T_b}{}^{u_n}$=start transmit time of UT#n burst;

$t_{R_{b1}}{}^{u_n}$=the time DL burst ($b_{1_R}{}^{u_n}$) is received through sat#$1_{u_n}$ at UT#n;

$\Delta T_{AR_{b1}}{}^{u_n}$=the advance/retard time required for UT#n to align its transmit timing with respect to the TAC through sat#$1_{u_n}$;

$7\tau$=the fixed part of the delay time for the worst case of user's position within 500 km by 500 km UL region;

n=the user number within an UL region; and $\tau$=the forward link burst duration (0.577 msec).

Equation (14) indicates that a fixed GT of $2\tau$ between transmitted bursts limits the number of users per 50 kHz to a fixed number of 10 UTs scattered within 500 km by 500 km. The upper limit of 10 users per 50 kHz is obtained from the frame duration of 36.92 msec ($64\tau$) and the UL duration of 3.46 msec ($6\tau$) needed (including the guard buffers of FIGS. 11A and 11B) to transmit a return link pulse. The calculations of the GT at the plurality of the visible satellites using this technique now will be described.

In general, the smaller the GT between adjacent transmitted bursts, the better is the system capacity as long as there is no collision at the visible satellites. In the above analysis, the timing calculations of the transmitted bursts from the users' locations have been introduced. In order to investigate the GT between bursts received at the visible satellites, computer simulations will be described to examine the GT between received bursts at all visible satellites for all 50 kHz return link carriers.

Figure 13:
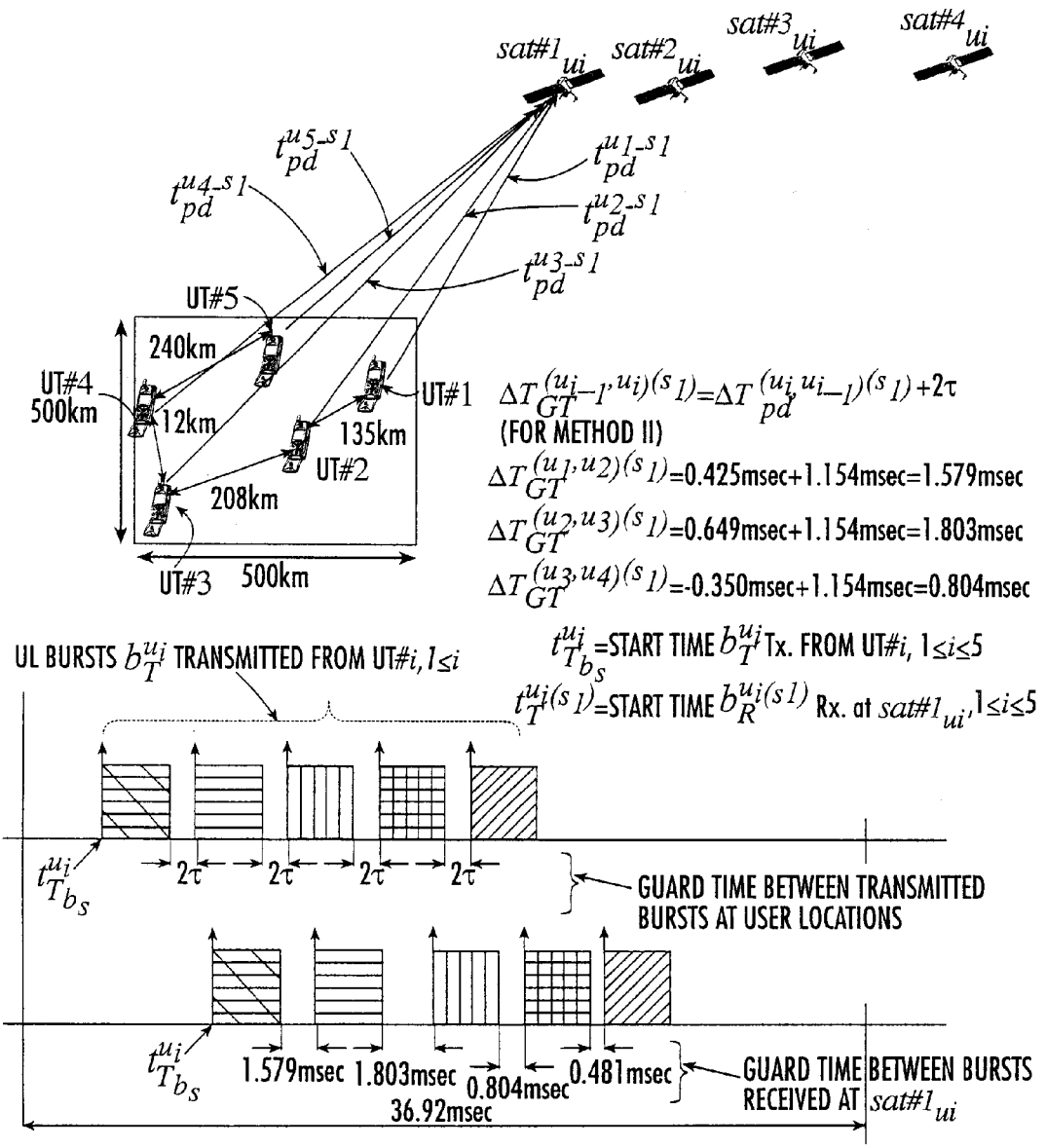
FIG. 13 is a timing diagram illustrating fixed guard time between transmitted bursts according to the present invention.

FIG. 13 shows an example for calculating the GT between received bursts at sat#1 via simulations. There are 5 users (randomly distributed within the 500 km by 500 km UL region) served by the same 50 kHz carrier. There its a fixed GT of $2\tau$ between transmitted bursts of all 5 UTs at the user's positions as was discussed previously. A general form for the GT between bursts received at sat#j (any one of the visible satellites) can be written as:

$$\Delta T_{GT}{}^{(u_{i-1}, u_i)(s_j)} = \Delta T_{pd}{}^{(u_i, u_{i-1})(s_j)} + 2\tau,$$

for $1 \leq i \leq 10$ (15)

where $\Delta T_{GT}{}^{(u_{i-1}, u_i)(s_j)}$=the guard time between received bursts of UT#i and UT#(i-1) at sat#j;

$\Delta T_{pd}{}^{(u_{i-1}, u_i)(s_j)}$=the differential propagation delay between transmitted bursts of UT#i to sat#j and UT#(i-1) to sat#j; and $2\tau$=the fixed guard time between transmitted bursts at the users' locations.

The GT between UL bursts (of users served by the same 50 kHz carrier) is calculated via simulations at sat#1 (for example) using Equation (15) and its shown in the lower burst structure of FIG. 13. It is observed from FIG. 13 and also from Equation (15) that the GT between bursts at sat#1 is varied. It depends on two factors, the differential propagation delay between adjacent (in time) users to the satellite and the fixed GT between transmitted bursts at the user's locations.

Figure 14:
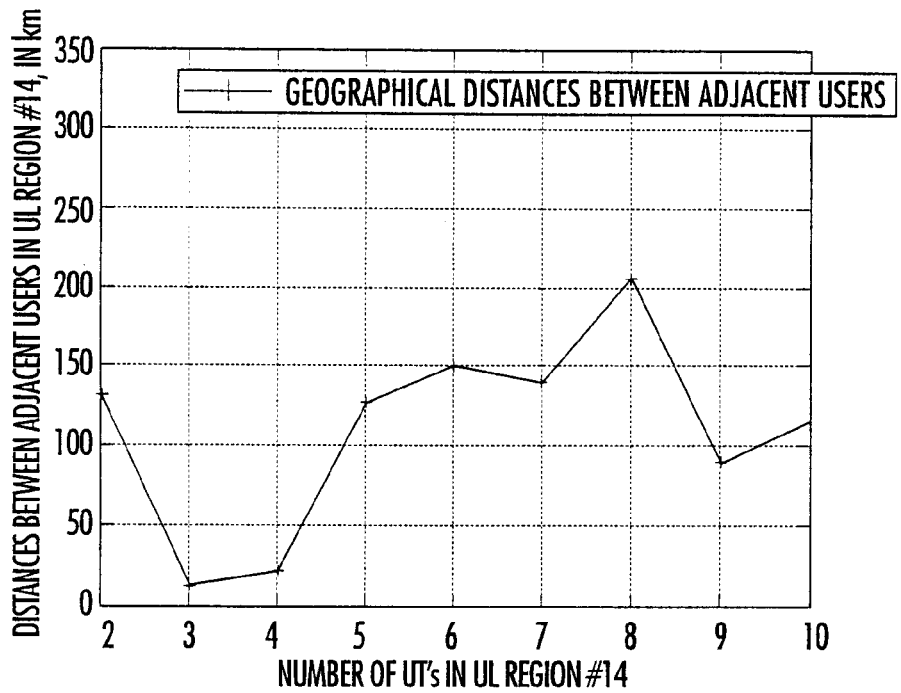
FIG. 14 graphically illustrates an example of geographical distances between adjacent users as a function of number of user terminals.
Figure 15:
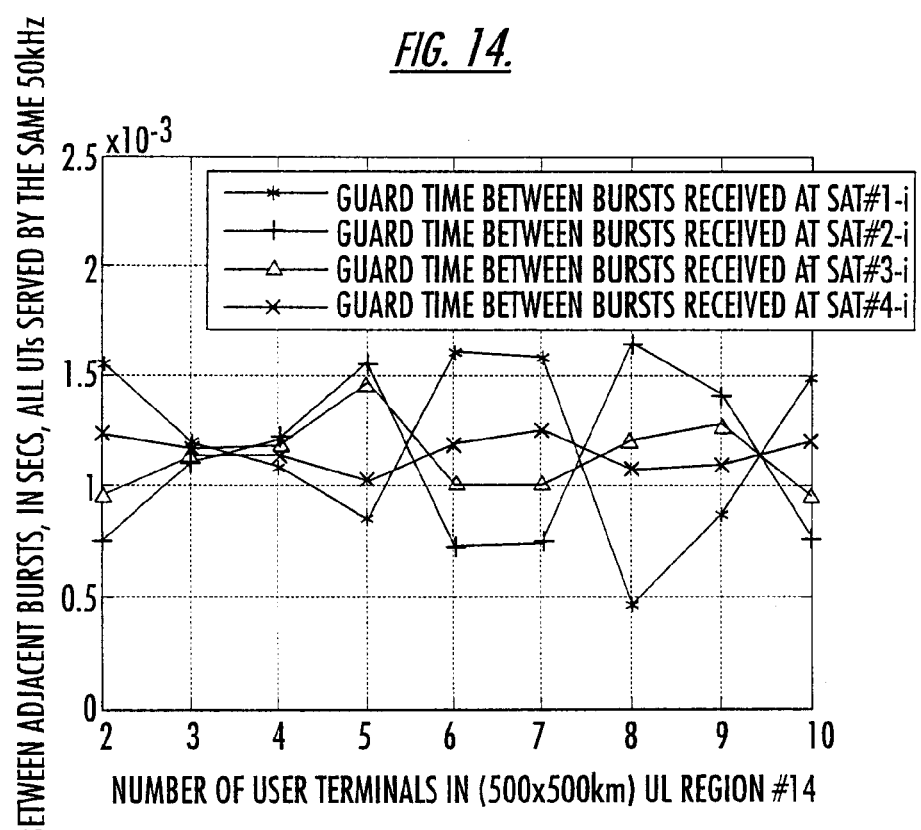
FIG. 15 graphically illustrates simulation results of guard times between adjacent bursts and number of user terminals in an uplink region.

The return link diversity operation using the fixed guard time was examined via computer simulations. FIG. 14 shows the adjacent distances between 10 randomly distributed users within 500 km by 500 km UL region. FIG. 15 shows that the transmitted bursts of the served users are received at all visible satellites (4 in this case) in a non-overlapping fashion. Therefore, diversity operation can be achieved successfully in the return link via all visible satellites. The computer simulations examined this technique over CONUS for 120 runs. As a result, there was no single burst collision at any visible satellite at any time.

Variable guard times related to users' transmissions now will be described. In the return link, each UT transmits one burst per frame. The transmitted bursts of users served by the same return link carrier are separated by enough variable guard time to avoid burst collisions, preferably at all visible satellites. Full diversity benefits may be obtained from all visible satellites while allowing extended battery life. As with fixed guard times, the ground station receives user's bursts through the visible satellites and can use a suitable diversity technique to combine those bursts.

The variable guard times can ensure that return link bursts of users served by the same return link carrier are not colliding at all visible satellites. Therefore, return link diversity operation through all visible satellites can be achieved successfully.

Figure 16:
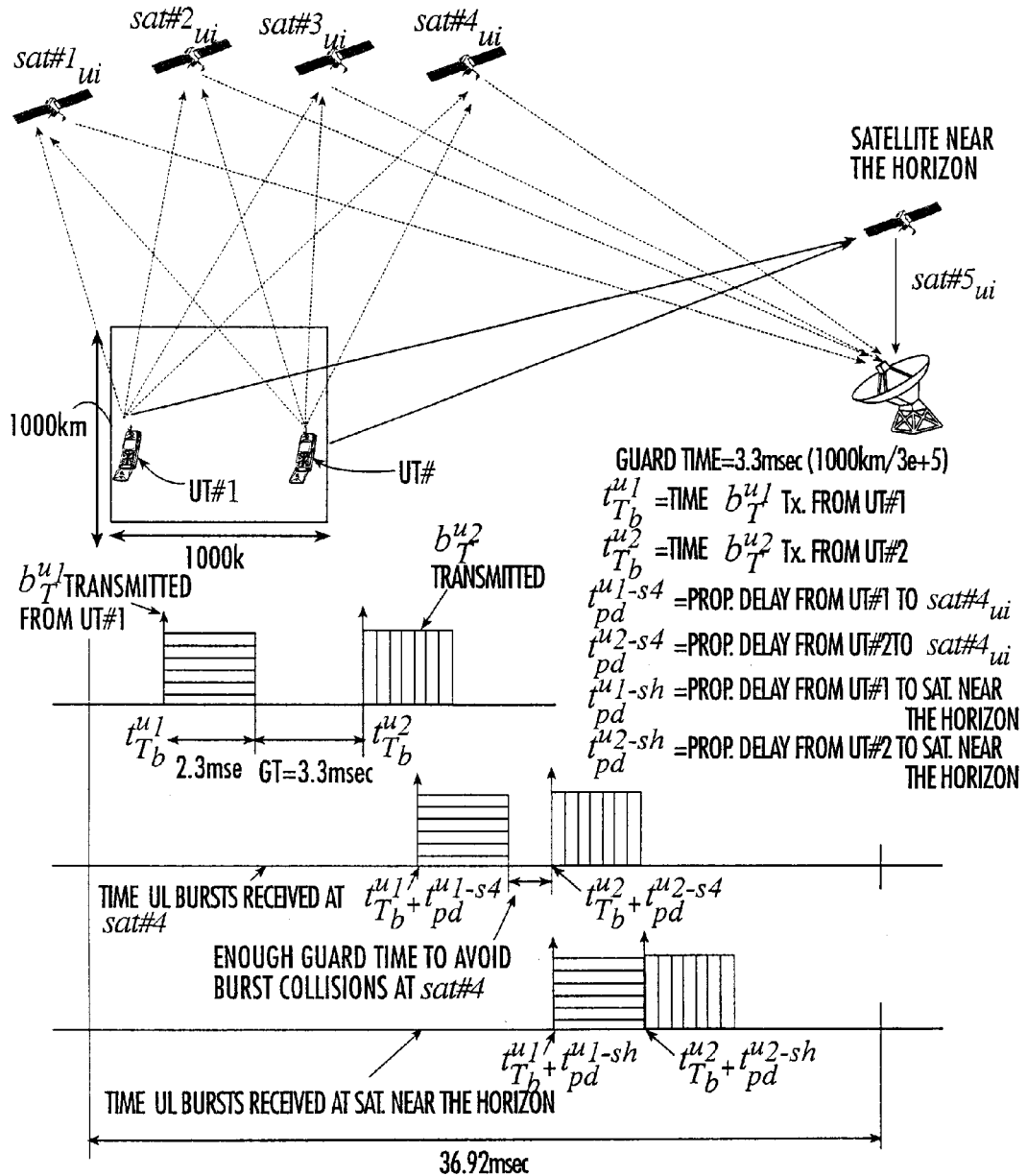
FIG. 16 is a timing diagram illustrating variable guard times between transmitted bursts according to the present invention.

In the return link, each UL region is assigned a different 50 kHz-carrier frequency. Assume that the UL region is a square of 1000 km by 1000 km. With two UTs located at the opposite edges of a region (1000 km apart) using the same return link carrier frequency, there is a potential +/-3.3 msec difference in propagation delay between both UTs and a satellite at a very low elevation angle near the horizon. In order to achieve diversity in the return link with all visible satellites to a UT, it should be assured that the UL bursts are not colliding at a satellite with a very low elevation angle near the horizon. This implies that UL bursts are received at all visible satellites in a non-overlapping fashion and return link diversity operation can be accomplished successfully. A typical value for the return link burst duration is 2.3 msec which is 4 times larger than the forward link burst duration of 0.577 msec. FIG. 16 shows the GT between two transmitted bursts at the users' locations and at different visible satellites with different elevation angles. The term $b_T{}^{u_i}$ represents the transmitted burst of UT#i. It is shown that by allowing the guard time between UL bursts to be the distance between adjacent (in time) users divided by the speed of light, burst collisions can be avoided at all visible satellites. FIG. 16 shows no burst collisions at sat#$5_{uj}$, where i=1,2 (the satellite in view of both users with the smallest elevation angles), which can assure no collision at the other three satellites of higher elevation angles.

Figure 17:
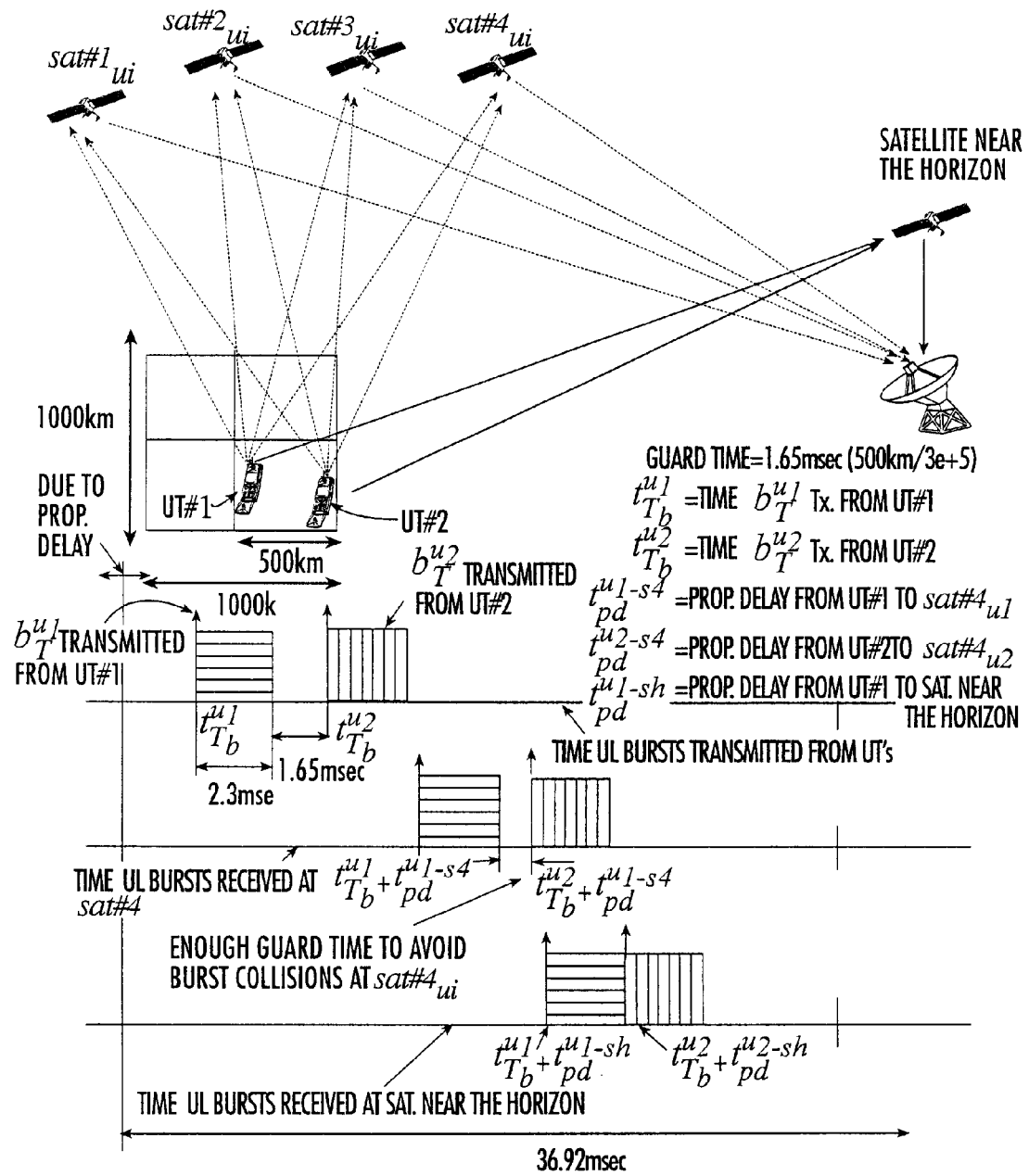
FIG. 17 is another timing diagram illustrating variable guard times between transmitted bursts according to the present invention.

Although a 3.3 msec GT between UL bursts is enough to avoid overlapping in time at all visible satellites, it may lead to inefficient use of the spectrum. The 1000 km by 1000 km DL region is divided into 4 smaller 500 km by 500 km UL regions and each UL region is served by a different (50 kHz) return link carrier frequency. FIG. 17 is similar to FIG. 16, but with the 1000 km by 1000 km DL region divided into four equal 500 km by 500 km UL regions. Different 50 kHz carriers serve each. For two UTs located at the opposite edges of one of the UL regions, the GT between transmitted bursts can be reduced from 3.3 msec to 1.65 msec which can provide better utilization of the resources and higher system capacity.

An analysis of variable GTs now will be provided. In this analysis, the GT between adjacent transmitted bursts depends on the geographical distances between adjacent (in time) users within the same UL region divided by the speed of light. This GT assures that adjacent bursts of users served by the same return link carrier are not colliding at a satellite with a very low elevation angle near the horizon so that no burst collisions may occur at all other satellites with higher elevation angles. It is assumed that the ground station has the intelligence of transmitting the advance/retard timing information to the users so that the start transmit time can be determined by the UT in reference to the reception of its first forward link burst through the best satellite in view.

Figure 18:
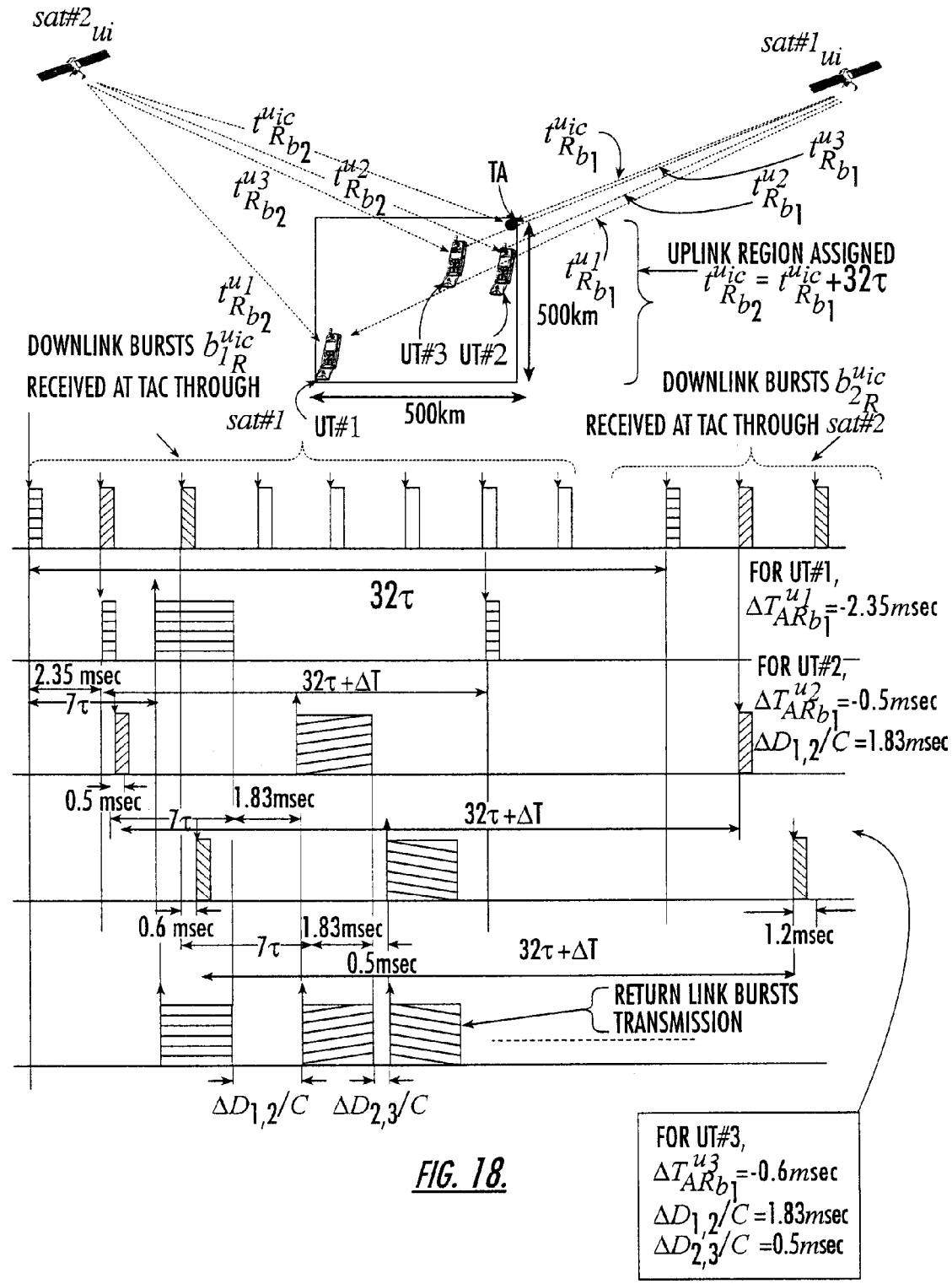
FIG. 18 is another timing diagram of forward and return link bursts according to the present invention.

FIG. 18 demonstrates one of the worst cases that can occur. The two selected satellites serving a group of scattered UTs within 500 km by 500 km region are located at the opposite sides of the horizon and are defined as sat#$1_{u_i}$ and sat#$2_{u_i}$. The served UL region is the southwest quarter of a 1000 km by 1000 km DL region where the TAC is located at the northeast corner of the UL region as shown in FIG. 18. There are three scattered users within the defined UL region and are indicated as UT#i, where $1 \leq i \leq 3$. For a UT located off the TAC, the time that the second burst is received through sat#$2_{u_i}$ is 32-DL timeslots +/− delta time ($32\tau+\Delta T$), delayed with respect to the first received burst via sat#1, where $\Delta T$ can be positive or negative depending on the UT's position with respect to the TAC. Therefore, the UT transmits an UL burst between the reception of the two successive bursts and the synthesizer switches back and forth. In addition, $t_{R_{b1}}{}^{u_ic}$ and $t_{R_{b2}}{}^{u_ic}$ indicate the time $b_{1_R}{}^{u_i}$ and $b_{2_R}{}^{u_i}$ are received through sat#$1_{u_i}$ and sat#$2_{u_i}$ at the TAC respectively.

The top burst structure in FIG. 18 shows the time $b_{1_R}{}^{u_i}$ and $b_{2_R}{}^{u_i}$ received at the TAC through sat#$1_{u_i}$ and sat#$2_{u_i}$ respectively. It can be seen that $b_{1_R}{}^{u_i}$ are the DL burst #1, 5, 9, . . . , up to $b_{1_R}{}^{u_i}$ #61 through sat#$1_{u_i}$, where $b_{2_R}{}^{u_i}$'s are the DL burst #'s 33, 37, 41, . . . , up to $b_{2_R}{}^{u_i}$ #29 of the next frame through sat#$2_{u_i}$. It can also be seen that at the TAC, the time between $b_{1_R}{}^{u_ic}$ and $b_{2_R}{}^{u_ic}$ is 32-DL timeslots (18.46 msec or $32\tau$) as shown in the top burst structure of the figure. It is observed that UT#1 is located at the diagonal corner (about 700 km) from the TAC. With sat#$1_{u_i}$ near the eastern horizon, this corresponds to a delay of 2.35 msec from the TAC at UT#1.

$$t_{R_{b1}}{}^{u_1}=t_{R_{b1}}{}^{u_1c}+2.35 \text{ ms} \tag{16}$$

where, $t_{R_{b1}}{}^{u_1}$=the time DL burst $b_{1_R}{}^{u_1}$ is received at UT#1 through sat#$1_{u_i}$; and $t_{R_{b1}}{}^{u_1c}$=the time DL burst $b_{1_R}{}^{u_1}$ is received at TAC through sat#$1_u{}^i$.

The ground station transmits advance/retard time ($\Delta T_{AR_{b1}}{}^{u_1}$) to UT#1 through sat#$1_{u_i}$ to adjust its transmission time by 2.35 msec, i.e., $\Delta T_{AR_{b1}}{}^{u_1}=-2.35$ ms.

It was mentioned previously that the fixed time delay is assumed as the worst case to be 7-DL timeslots (4.04 msec or $7\tau$). Therefore, $$t_{T_b}{}^{u_1}=t_{R_{b1}}{}^{u_1}+\Delta T_{AR_{b1}}{}^{u_1}+7\tau \tag{17}$$

where, $t_{T_b}{}^{u_1}$=the time UT#1 starts transmitting $b_T{}^{u_1}$; and $\Delta T_{AR_{b1}}{}^{u_1}$=the advance/retard time needed for UT#1 to align its transmission timing with respect to $t_{R_{b1}}{}^{u_1}$.

Similarly, UT#2 is located at 150 km south of the TAC and about 550 km away from UT#1. With sat#$1_{u_2}$ near the eastern horizon, this corresponds to a delay at UT#2 of 0.5 msec from the TAC.

$$t_{R_{b1}}{}^{u_2}=t_{R_{b1}}{}^{u_2c}+0.5 \text{ m sec} \tag{18}$$

where, $t_{R_{b1}}{}^{u_2}$=the time DL burst $b_{1_R}{}^{u_2}$ is received at UT#2 through sat#$1_{u_2}$; and $t_{R_{b1}}{}^{u_2c}$=the time DL burst $b_{1_R}{}^{u_2}$ is received at TAC through sat#$1_{u_2}$.

Therefore, the advance/retard timing assigned to UT#2 is $\Delta T_{AR_{b1}}{}^{u_2}=-0.5$ m sec. The adjustable time delay has an extra term for UT#2 which is the adjacent (in time) geographical distance between UT#1 and UT#2 divided by the speed of light.

$$t_{T_b}{}^{u_2}=t_{R_{b1}}{}^{u_2}+\Delta T_{AR_{b1}}{}^{u_2}+7\tau+(\Delta D_{1,2}/C) \tag{19}$$

where, $t_{T_b}{}^{u_2}$=the time UT#2 starts transmitting $b_T{}^{u_2}$;

$t_{R_{b1}}{}^{u_2}$=the time DL burst $b_{1_R}{}^{u_2}$ is received at UT#2 through sat#$1_{u_2}$;

$\Delta T_{AR_{b1}}{}^{u_2}$=the advance/retard time needed for UT#2 to align its transmission timing with respect to $t_{R_{b1}}{}^{u_2}$; and $\Delta D_{1,2}/C$=geographical distance between UT#1 and UT#2 divided by the speed of light.

Similarly, UT#3 is located at 180 km south west of the TAC and about 150 km away from UT#2. With sat#$1_{u_3}$ near the eastern horizon, this corresponds to a delay of 0.6 msec from the TAC at UT#3.

$$t_{R_{b1}}{}^{u_3}=t_{R_{b1}}{}^{u_3c}+0.6 \text{ m sec} \tag{20}$$

where, $t_{R_{b1}}{}^{u_3}$=the time DL burst $b_{1_R}{}^{u_3}$ is received at UT#3 through sat#$1_{u_3}$; and $t_{R_{b1}}{}^{u_3c}$=the time DL burst $b_{1_R}{}^{u_3}$ is received at TAC through sat#$1_{u_3}$.

The advance/retard timing for UT#3 is $\Delta T_{AR_{b1}}{}^{u_3}=-0.6$ m sec. The adjustable time delay has an extra term for UT#3 which is the adjacent (in time) geographical distance between UT#2 and UT#3 divided by the speed of light.

$$t_{T_b}{}^{u_3}=t_{R_{b1}}{}^{u_3}+\Delta T_{AR_{b1}}{}^{u_3}+7\tau+(\Delta D_{1,2}+\Delta D_{2,3})/C \tag{21}$$

where, $t_{T_b}{}^{u_3}$=the time UT#3 starts transmitting $b_T{}^{u_3}$;

$t_{R_{b1}}{}^{u_3}$=the time DL burst $b_{1_R}{}^{u_3}$ is received at UT#3 through sat#$1_{u_3}$;

$\Delta T_{AR_{b1}}{}^{u_3}$=the advance/retard time needed for UT#3 to align its transmission timing with respect to $t_{R_{b1}}{}^{u_3}$; and $\Delta D_{2,3}$=geographical distance between UT#2 and UT#3.

In general, as the number of users increases per the same UL carrier, the start transmit time of users is shifted more to the right as indicated in the second, third, and the fourth burst structures of FIG. 18. The upper limit is the reception time of the DL burst $b_{R_b}{}^{u_i}$ (start of the burst) through sat#$2_{u_i}$ to each user, in order to maintain the timing of UL burst transmission between the reception of successive DL bursts to each UT. For this reason, the fixed time delay part of the GT preferably was selected as small as possible, so UL burst transmission timing (start of burst) can be always as close as possible to the time of reception of the DL burst $b_{1_R}{}^{u_i}$ through sat#$1_{u_i}$. The computer simulations showed how many UL bursts of users served by the same 50 kHz carrier could be occupied in 64-DL timeslot frame duration and received at all visible satellites in a non-overlapping fashion. Therefore, it showed how many users could be served successfully in diversity mode in the return link.

Finally, the last burst structure of FIG. 18 also shows the results. It indicates that the time between adjacent transmitted bursts (of users served by the same UL carrier) is the adjacent distances between users divided by the speed of light. Even in one of the worst cases of user locations and satellite positions similar to this example, diversity in the return link through all visible satellites may be achievable. The last burst structure of FIG. 18 shows that the transmitted bursts are separated by a varied GT depending on the adjacent distances between users.

A general expression for the return link burst timing can be obtained using the mathematical induction approach as:

$$t_{T_b}^{u_n} = t_{R_{b_1}}^{u_n} + \Delta T_{AR_{b_1}}^{u_i} + 7\tau + \frac{1}{C}\sum_{i=1}^{n}\Delta D_{(i-1),i}$$

for $n=2, 3, 4, \ldots, N$ and $N \leq 16$ for n=1, $$t_{T_b}^{u_1} = t_{R_{b_1}}^{u_1} + 7\tau + \Delta T_{AR_{b_1}}^{u_1}$$

Constraint:

$$[(t_{T_b}^{u_n}+4\tau)-t_{T_b}^{u_1}] \leq 60\tau \quad (22)$$

Where, $t_{T_b}^{u_n}$ = start transmit time of UT#n's burst;

$t_{R_{b_1}}^{u_n}$ = the time DL burst $b_{1_R}^{u_n}$ is received through $sat\#1_{u_n}$ at UT#n;

$\Delta T_{AR_{b_1}}^{u_n}$ = the advance/retard time required for UT#n to align its transmit timing with respect to the TAC through $sat\#1_{u_n}$; and $$\frac{1}{C}\sum_{i=1}^{n}\Delta D_{(i-1),i}$$

=summation of the adjacent (in time) distances between users within the same UL carrier divided by the speed by light.

Equation (22) gives a closed form expression for burst's transmit time (start of the burst) of all users served by the same return link carrier. It has a limit of 16 users (if all users nearby each other) per 50 kHz UL carrier as the eighth rate GSM is assumed. The constraint can assure that there is enough time per 64-DL timeslot frame to transmit user's burst of 4-DL timeslot duration. This approach was investigated via computer simulations. By running the simulations for 120 minutes to allow every single satellite to complete its orbit (Globalstar satellite system was taken as an example), there was no single burst collision at any visible satellites at any time.

A detailed analysis of GT calculations at the plurality of visible satellites now will be presented. Generally, the less GT between adjacent transmitted bursts, the better system capacity as long as there is no collision at the visible satellites. In the above analysis, the timing calculations of the transmitted bursts from the user's locations have been introduced. In order to investigate the GT between bursts received at the visible satellites, a 50 kHz return link carrier is used as an example. The concept is explained via example with real simulated data. Then, the computer simulations examined this approach over the continental United States using Globalstar system parameters.

Figure 19:
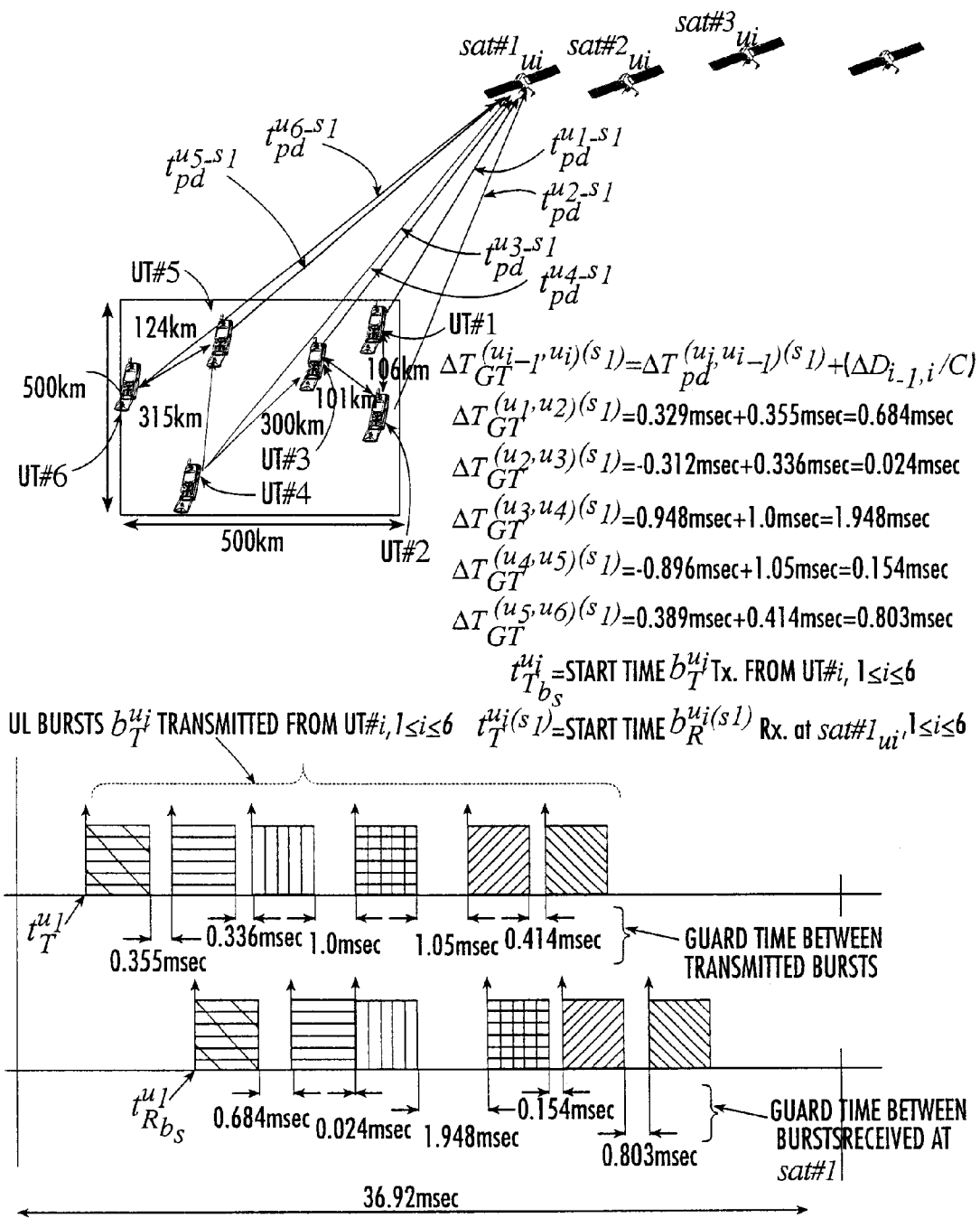
FIG. 19 is a timing diagram illustrating variable guard time between transmitted bursts according to the present invention.

In clarifying the GT calculations, one visible satellite is selected. For example, assume there are 6 user terminals (UT#i, $1 \leq i \leq 6$) distributed randomly and served by the same 50 kHz return link carrier as is shown in FIG. 19. It is seen in the figure that there are 4 visible satellites in view of the UTs. Also, assuming that the visible satellites are the best (from the elevation angle criterion) in view of each user as is indicated in FIG. 19. The geographical distances between users are indicated on the top part of FIG. 19, to check the GT between user's received bursts at sat#1 via simulations. Each of the users has its own propagation delay to $sat\#1_{u_i}$ as indicated in FIG. 19 and is denoted by $t_{pd}^{u_i-s_1}$ where $1 \leq i \leq 6$. The top burst structure in the figure shows the GT between transmitted bursts at the user's locations. This GT is a function of the distances between adjacent (in time) users. For example, the geographical distance between UT#2 and UT#3 is shown in FIG. 19 as 101 km which implies a GT between transmitted bursts of UT#2 and UT#3 of 0.336 msec. The GT between other transmitted bursts may be calculated similarly and is indicated in the top burst structure of the figure. A general form for the GT between bursts of UT#(i-1) and UT#i at sat#1 can be written as;

$$\Delta T_{GT}^{(u_{i-1},u_i)(s_1)} = \Delta T_{pd}^{(u_i,u_{i-1})(s_1)} + (\Delta D_{i-1,i}/C), \text{ for } 1 \leq i \leq 16 \quad (23)$$

where:

$\Delta T_{GT}^{(u_{i-1},u_i)(s_1)}$ = the guard time between received bursts of UT#i and UT#(i-1) at sat#1;

$\Delta T_{pd}^{(u_i,u_{i-1})(s_1)}$ = the differential propagation delay of transmitted bursts of UT#i and sat#1 and UT#(i-1) and sat#1; and $\Delta D_{(i-1),i}/C$ = the geographical distance between UT#i and UT#(i-1) divided by the speed of light.

The GT between UL bursts (of users served by the same 50 kHz carrier) is calculated via simulations at sat#1 based on Equation (23) and is shown in the lower burst structure of FIG. 19. As shown in the lower burst structure of FIG. 19 and also in Equation (23), the GT between bursts at sat#1 is varied. It generally depends on two factors, the differential propagation delay between adjacent (in time) users to the satellite and the distances between adjacent (in time) users.

Figure 20:
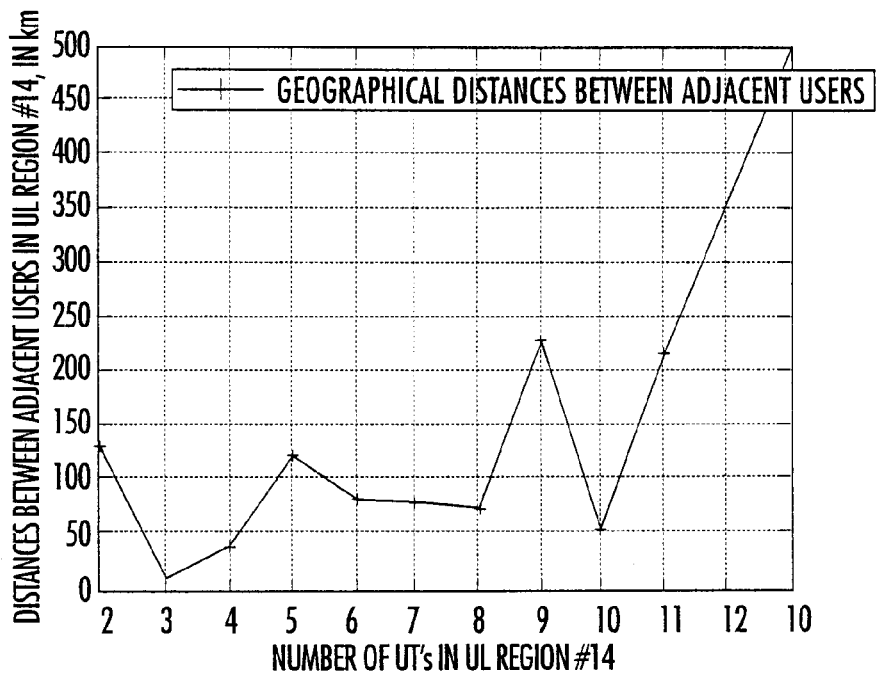
FIG. 20 graphically illustrates an example of geographical distances between adjacent users as a function of number of user terminals.
Figure 21:
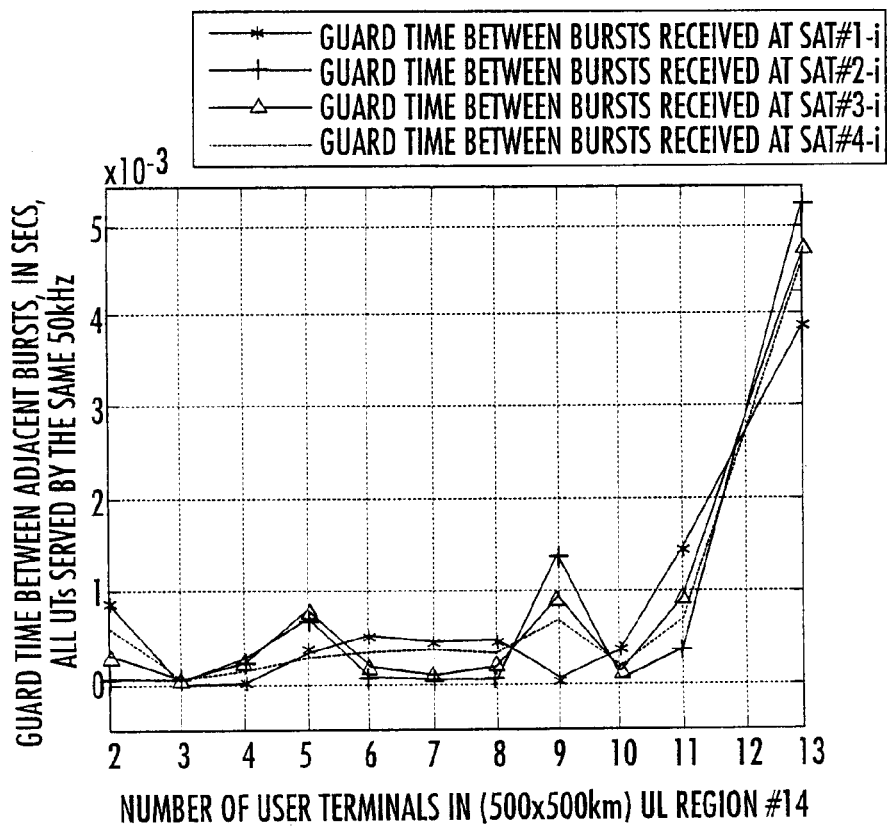
FIG. 21 graphically illustrates simulation results of guard times between adjacent bursts and number of user terminals in an uplink region.

The analysis represents the varied GT between transmitted bursts of users served by the same 50 kHz carrier that is used to prevent burst collisions at all visible satellites. It is defined as the distances between adjacent (in time) users divided by the speed of light. The return link diversity operation for users located in UL region #14 of FIG. 9 as an example, was simulated. FIG. 20 shows the adjacent distances between those 13 randomly distributed users versus the number of users served by the same 50 kHz carrier. FIG. 21 shows the GT between received bursts of users served by the same 50 kHz located at UL region #14 at all visible satellites. It is shown in FIG. 21 that the GT between adjacent bursts received at all visible satellites is always positive. Therefore, all bursts of users serving in UL region #14 are received at all visible satellites in a non-overlapping fashion. In summary, the computer simulations examined the diversity operation in the return link over the continental United States land area assuming Globalstar system parameters for 120 runs. As a result, there was no single burst collision at any visible satellite at any time.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of transmitting downlink signal bursts from a plurality of visible satellites to a plurality of user terminals in a downlink region that is serviced by the plurality of visible satellites, the method comprising:

sending a first downlink signal burst from a first one of the visible satellites to a first user terminal in the downlink region;

sending a second downlink signal burst from a second one of the visible satellites to the first user terminal so that it will be received at a time that is a function of a separation distance of the first user terminal in the downlink region from a center of the downlink region; and repeating the steps of sending a first downlink signal burst and sending a second downlink signal burst for other user terminals in the downlink region;

wherein the downlink signal bursts are sent in a plurality of repeating frames of downlink signal bursts having a predetermined frame repetition period; and wherein the step of sending a second downlink signal burst comprises the step of sending a second downlink signal burst from a second one of the visible satellites to the first user terminal so that it will be received relative to the first downlink signal burst at a time offset that is one half the predetermined frame repetition period plus a delay time $\Delta T$ that is a function of a separation distance of the first user terminal in the downlink region from the center of the downlink region.

2. A method according to claim 1:

wherein the step of sending a first downlink signal burst comprises the step of sending a first downlink signal burst over a first carrier frequency; and wherein the step of sending a second downlink signal burst comprises the step of sending a second downlink signal burst over a second carrier frequency.

3. A method according to claim 1 wherein the delay time $\Delta T$ corresponds to a differential propagation delay of the second downlink signal burst from the second one of the visible satellites to the first user terminal and to a user terminal that is located at the center, minus a differential propagation delay of the first downlink signal burst from the first one of the visible satellites to the first user terminal and to a user terminal that is located at the center.

4. A method according to claim 3 wherein the downlink region is sufficiently small such that the first user terminal can receive the first downlink signal burst from the first visible satellite and the second downlink signal burst from the second visible satellite when the first and second visible satellites are located on respective opposite sides of the horizon and the first user terminal is located in the downlink region farthest from the center, with sufficient time therebetween that the first user terminal can transmit an uplink signal burst between the first and second downlink signal bursts.

5. A method according to claim 1 wherein the downlink region is sufficiently small such that the first user terminal can receive the first downlink signal burst from the first visible satellite and the second downlink signal burst from the second visible satellite when the first and second visible satellites are located on respective opposite sides of the horizon and the first user terminal is located in the downlink region farthest from the center, with sufficient time therebetween that the first user terminal can transmit an uplink signal burst between the first and second downlink signal bursts.

6. A method according to claim 1 further comprising the step of transmitting an uplink signal burst from the first user terminal for reception by at least two of the plurality of visible satellites.

7. A method according to claim 6 wherein the transmitting step comprises the step of:

transmitting the uplink signal burst a guard time after an immediately preceding uplink signal burst from an immediately preceding one of the user terminals, the guard time being based upon a time of arrival difference for the adjacent uplink signal bursts to one of the plurality of visible satellites.

8. A method according to claim 7 wherein the transmitting step comprises the step of:

transmitting the uplink signal burst a fixed guard time after an immediately preceding uplink signal burst from an immediately preceding one of the user terminals, the fixed guard time corresponding to a maximum time of arrival difference between adjacent uplink signal bursts from a pair of user terminals that are a maximum distance apart to one of the plurality of visible satellites.

9. A method according to claim 7 wherein the transmitting step comprises the step of:

transmitting the uplink signal burst a variable guard time after an immediately preceding uplink signal burst from an immediately preceding one of the user terminals, the variable guard time corresponding to a time of arrival difference between adjacent uplink signal bursts from a corresponding pair of user terminals to one of the plurality of visible satellites.

10. A method according to claim 1 wherein the first one of the visible satellites is at highest elevation angle and wherein the second one of the visible satellites is at a next highest elevation angle.

11. A method according to claim 1 further comprising the step of:

diversity combining the received first and second downlink signal bursts at each of the plurality of user terminals.

12. A satellite radiotelephone system that communicates with a plurality of user terminals in a downlink region, the satellite radiotelephone system comprising:

a first satellite that sends a first downlink signal burst to each of the plurality of user terminals in the downlink region; and a second satellite that sends a second downlink signal burst to each of the plurality of user terminals so as to be received at a respective time that is a function of a separation distance of the respective user terminal in the downlink region from a center of the downlink region;

wherein the downlink signal bursts are sent in a plurality of repeating frames of downlink signal bursts having a predetermined frame repetition period; and wherein the second satellite sends the second downlink signal burst to each of the plurality of user terminals so as to be received relative to the first downlink signal burst at a time that is one half the predetermined frame repetition period plus a delay time $\Delta T$ that is a function of a separation distance of the corresponding user terminal in the downlink region from the center of the downlink region.

13. A system according to claim 12:

wherein the first downlink signal bursts are sent over a first carrier frequency; and wherein the second downlink signal bursts are sent over a second carrier frequency.

14. A system according to claim 12 wherein the delay time $\Delta T$ corresponds to a differential propagation delay of the second downlink signal burst from the second satellite to the corresponding user terminal and to a user terminal that is located at the center, minus a differential propagation delay of the first downlink signal burst from the first satellite to the corresponding user terminal and to a user terminal that is located at the center.

15. A system according to claim 14 wherein the downlink region is sufficiently small such that the user terminal can receive the first downlink signal burst from the first satellite and the second downlink signal burst from the second satellite when the first and second satellites are located on respective opposite sides of the horizon and the user terminal is located in the downlink region farthest from the center, with sufficient time therebetween that the user terminal can transmit an uplink signal burst between the first and second downlink signal bursts.

16. A system according to claim 12 wherein the downlink region is sufficiently small such that the user terminal can receive the first downlink signal burst from the first satellite and the second downlink signal burst from the second satellite when the first and second satellites are located on respective opposite sides of the horizon and the user terminal is located in the downlink region farthest from the center, with sufficient time therebetween that the user terminal can transmit an uplink signal burst between the first and second downlink signal bursts.

17. A system according to claim 12 wherein the first and second satellites also receive an uplink signal burst from each of the user terminals without time overlap.

18. A system according to claim 12 wherein the first satellite is at highest elevation angle and wherein the second satellite is at a next highest elevation angle.

* * * * *